(12) United States Patent
De Bonet et al.

(10) Patent No.: US 7,058,694 B1
(45) Date of Patent: Jun. 6, 2006

(54) METHOD FOR COMPARING TWO TRINARY LOGIC REPRESENTATIONS IN THE PROCESS OF CUSTOMIZING RADIO BROADCASTING

(75) Inventors: Jeremy S. De Bonet, Austin, TX (US); Paul A. Viola, Brookline, MA (US)

(73) Assignee: Clix Network, Inc., Austin, TX (US)

( * ) Notice: Subject to any disclaimer, the term of this patent is extended or adjusted under 35 U.S.C. 154(b) by 755 days.

(21) Appl. No.: 09/656,950

(22) Filed: Sep. 7, 2000

(51) Int. Cl.
G06F 15/16 (2006.01)

(52) U.S. Cl. .......................... 709/217; 714/39; 707/3; 455/3.03

(58) Field of Classification Search ........ 709/217–219; 704/500; 707/3, 6
See application file for complete search history.

(56) References Cited

U.S. PATENT DOCUMENTS

| | | | |
|---|---|---|---|
| 5,455,570 A | 10/1995 | Cook | |
| 5,815,662 A | 9/1998 | Ong | |
| 5,818,510 A | 10/1998 | Cobbley et al. | |
| 5,986,692 A | 11/1999 | Logan et al. | |
| 6,038,591 A | 3/2000 | Wolfe et al. | |
| 6,081,780 A | 6/2000 | Lumelsky | |
| 6,088,722 A | 7/2000 | Herz et al. | |
| 6,122,757 A * | 9/2000 | Kelley | 714/39 |
| 6,128,663 A | 10/2000 | Thomas | |
| 6,161,142 A | 12/2000 | Wolfe et al. | |
| 6,167,393 A * | 12/2000 | Davis et al. | 707/3 |
| 6,246,672 B1 | 6/2001 | Lumelsky | |
| 6,289,165 B1 | 9/2001 | Abecassis | |
| 6,314,094 B1 | 11/2001 | Boys | |
| 6,317,784 B1 | 11/2001 | Mackintosh et al. | |
| 6,335,927 B1 | 1/2002 | Elliott et al. | |
| 6,339,693 B1 | 1/2002 | Chan | |
| 6,345,289 B1 | 2/2002 | Lotspiech et al. | |
| 6,377,782 B1 | 4/2002 | Bishop | |
| 6,411,992 B1 * | 6/2002 | Srinivasan et al. | 709/218 |
| 6,477,707 B1 | 11/2002 | King et al. | |
| 6,487,390 B1 | 11/2002 | Virine et al. | |
| 6,496,802 B1 | 12/2002 | van Zoest et al. | |
| 6,560,651 B1 | 5/2003 | Katz et al. | |
| 6,587,127 B1 * | 7/2003 | Leeke et al. | 345/765 |
| 6,615,039 B1 | 9/2003 | Eldering | |
| 2001/0025259 A1 | 9/2001 | Rouchon | |
| 2002/0023270 A1 | 2/2002 | Thomas et al. | |
| 2002/0116082 A1 | 8/2002 | Gudorf | |
| 2002/0183059 A1 | 12/2002 | Noreen et al. | |

* cited by examiner

*Primary Examiner*—Wen-Tai Lin
(74) *Attorney, Agent, or Firm*—Fay Kaplun & Marcin, LLP

(57) ABSTRACT

A method for efficiently comparing two trinary logic representations, including the steps of creating a first data structure (a VALUE data structure) representative of a first set of properties; creating a second data structure (a KNOWN data structure) representative of whether the first set of properties is known; creating a third data structure (a TARGET data structure) representative of a target set of properties; creating a fourth data structure (a WANT data structure) representative of whether the target set of properties is wanted; and comparing the first, second, third, and fourth data structures using bit-wise binary operations to determine whether the first set of known properties are wanted as a target set of properties. In exemplary embodiments, the bit-wise binary operations are performed according to the Boolean equation: (not WANT) or (KNOWN and ((TARGET xor VALUE))). Alternatively, the bit-wise binary operation are performed according to the Boolean equation: (not WANT) or (KNOWN and ((TARGET and VALUE) or ((not TARGET) and (not (VALUE))). These data structures may be any size computer word, including 16 and 32-bit words.

22 Claims, 20 Drawing Sheets

Advertising AE Demographics

User Demographics (not WANT) or (KNOWN and (TARGET xnor VALUE))

(not WANT) or (KNOWN and ((TARGET and VALUE)
or ((not TARGET) and (not VALUE)))

(~WANT) v (KNOWN ^ ((TARGET ^ VALUE) v (~ TARGET ^ ~VALUE))

(~WANT) v (KNOWN ^ (TARGET == VALUE))

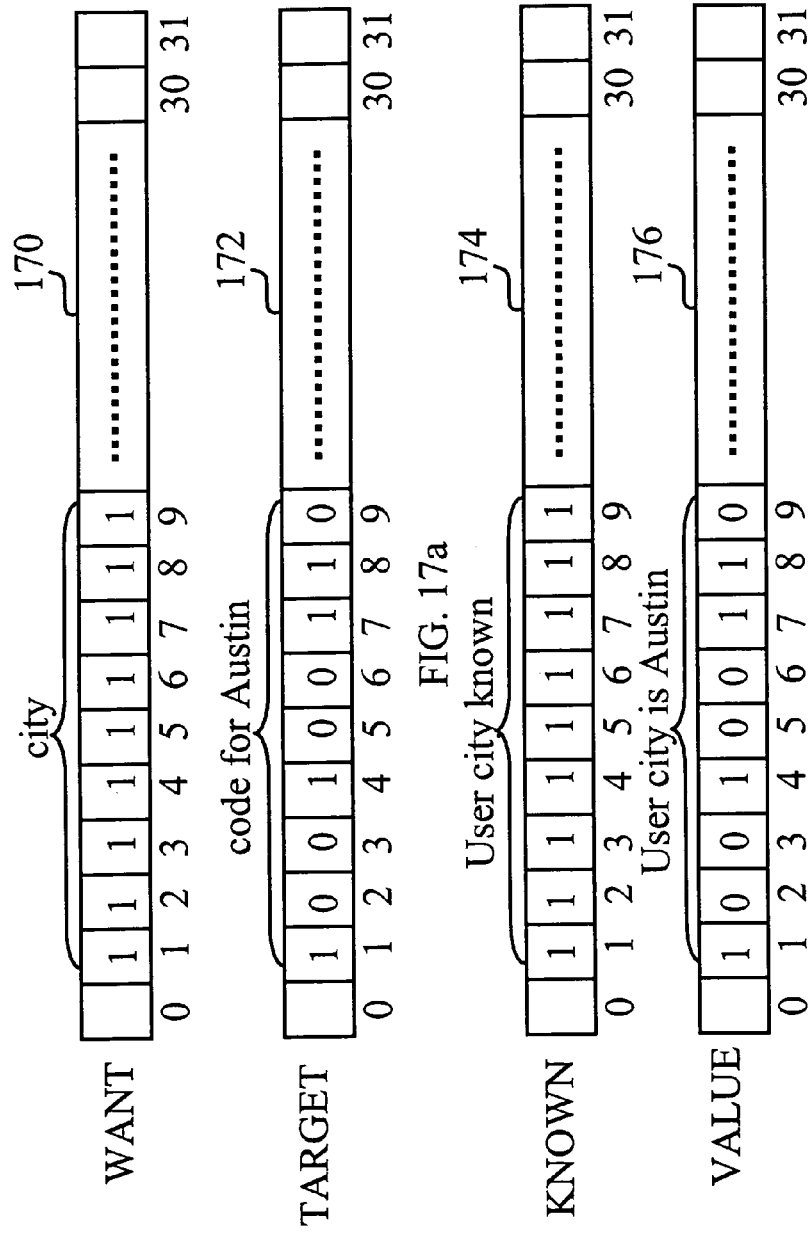

US 7,058,694 B1

METHOD FOR COMPARING TWO TRINARY LOGIC REPRESENTATIONS IN THE PROCESS OF CUSTOMIZING RADIO BROADCASTING

BACKGROUND OF THE INVENTION

1. Field of the Invention

The present invention relates to a method and system for providing an unlimited number of users an independently customized broadcast. More particularly, the present invention relates to a method and system for providing a customized radio station with the same variety and control provided today in traditional radio, but customized for each individual end user independently and simultaneously. The radio station generated for each user consists of audio elements that are customized for the individual end user.

2. Background Discussion

Radio broadcasting provides a means for transmission of information and entertainment to millions of radio listeners. Traditional radio broadcasting has required a full radio broadcast station to create and assemble a single set of content (music, advertising, etc.) that is broadcast to all listeners. Current radio broadcasting attempts to tailor its content to the particular audience that the station desires to attract as listeners. For example, some radio stations dedicate programming to talk shows or a particular type of music (contemporary, country, etc.). However, current radio broadcast systems do not tailor content based on particular characteristics and desires of each individual listener.

The emergence of the Internet has provided an alternate transmission media for traditional radio and other types of broadcasts. To use the Internet, broadcast signals must be digitized, packetized, and transmitted to a remote user. Because these broadcasts are digitized, the broadcast signal may be stored for later transmission. An example of a system that provides for later transmission of a broadcast signal is the Internet jukeboxes available from companies such as RealNetworks. The RealNetworks system provides access to a collection of Internet music selected to fit the individual end user. Using the RealNetworks system, a user may select and receive music or other audio content upon demand. Other systems, such as LaunchCast from Launch.com, attempt to construct a collection of Internet music appropriate for the end user by making inferences from user feedback. In these systems, content is provided using "streaming audio." In other systems, video content is provided using "streaming video." That is, the audio and video content is embedded for streaming playback within a web page. In addition, these systems stream audio or video to the user by selecting content from the user's collection either randomly or on demand.

Although known Internet radio broadcast systems have provided some convenience and advantage over traditional radio broadcasts, a number of disadvantages remain. For example, these Internet radio broadcast systems lack the ability to create a customized audio program consisting of carefully controlled variety based upon a user's preferences, demographics, and listening history. Although some web-based customizable newspapers have been developed that provide customized news based on a user's preferences and demographics, no system provides a personal radio system that allows the user to customize the radio broadcast content based on the user's preferences and demographics.

Therefore, a need exists for a personal radio system that is customizable based on the user's preferences and demographics. More specifically, a need exists for a radio broadcast system that allows a user to select the format and content to be provided within the radio broadcast. In addition, a need exists for a personal radio system that provides a customizable radio experience over the Internet, but still provides the same experience to a listener as if listening to a traditional radio broadcast.

Further, a need exists for other types of server systems that provide other types of customizable content, including video content.

SUMMARY OF THE INVENTION

The present invention delivers a custom broadcast, assembled on demand, for each individual user. More particularly, the present invention delivers a custom radio station, assembled on demand, for each listener. Like traditional broadcast radio, the audio experience consists of music introduced by a disk jockey (DJ), jingles, news, sports, weather, stock reports, and advertisements. However, the present invention provides for the transmission of a radio broadcast to an individual listener such that each of these audio elements is customized for the individual end user. More particularly, by maintaining a user profile that represents the preferences and particular interests of a user, and a user state that maintains the recent listening history of the user, the present system generates a uniquely tailored content stream that the user is more likely to enjoy over traditional broadcast radio. The individual's listening experience is continually refined and improved by modifying the user profile and updating the user state. The present invention modifies the user profile by using information gathered directly from the user, through collaborative filtering of other users, via data-sharing partnerships, and through direct manipulation by radio programmers.

In an embodiment, the present invention includes a personal broadcast server system for providing a customized broadcast to one or more users over a transmission media. The personal broadcast server system includes: a data storage device for storing a plurality of broadcast elements; a data management system for storing a user profile and a user state for each of the one or more users, wherein the data management system further stores information associated with each of the plurality of broadcast elements; a broadcast element selector having one or more broadcast element selection functions, wherein each broadcast element selection function is operable to select broadcast elements from the data storage device based on a user's user profile, the user's user state, and the information associated with each of the plurality of broadcast elements; and a broadcast server operable to receive the selected broadcast elements from the data storage device and to provide the selected broadcast elements to the user over the transmission media.

In alternate embodiments, the data storage device of the personal broadcast server system is a file server or a database. In addition, the personal broadcast server system may be implemented as a single computing device, or alternatively, mulitple computing devices.

The personal broadcast server system may also include a history of usage for each of the users. Based on the history of usage, the present invention may prevent broadcast elements from being delivered to a user.

According to the present invention, the personal broadcast server system may be used to provide audio or video elements to a user. In an embodiment, the audio or video elements are streamed over the Internet to the user. The types of audio elements that may be provided to the remote use includes music, advertising, talk by a DJ, or other audio content.

In yet another embodiment of the present invention, the user profiles that are stored in the data management system include initial registration information derived from when the user first logs in. Alternatively, the user profiles include demographic information relating to each user. The user profiles may also include information related to a user's preferred frequency of content, which may be automatically updated based on the listening patterns of the user.

More specifically, the present invention provides a customized radio broadcast to one or more users by providing a personal radio server system that includes a general purpose computer having a central processing unit and memory for storing user profiles for one or more users. The central processing unit includes a program that causes the central processing unit to produce individual audio streams for each of the one or more users based on the user profiles stored in memory. The individual audio streams may be comprised of one or more audio elements, which may be stored on a filed server.

In another aspect of the present invention, a method of using a personal radio server for transmitting customized radio content to a remote listener over a transmission media is provided. Specifically, the method comprises: storing a plurality of audio elements; dynamically generating and updating a user profile that represents the preferences, demographics, and interests of the remote listener; selecting audio elements to provide to the remote listener based on the remote listener's preferences, demographics, and interests; and transmitting the audio elements to the remote listener over the transmission media. In alternate embodiments, the method further includes the steps of maintaining a history of the audio elements provided to the remote user, and selecting audio elements to provide to a user based on the history of audio elements previously provided to the remote user.

In yet another embodiment, the method of providing customized radio content of provides for selecting audio elements by receiving and storing a user's ratings of one or more audio elements; comparing the user's ratings for the one or more audio elements to ratings from other users; predicting the user's ratings for different audio elements based on ratings from other users with similar ratings to the user's ratings of one or more audio elements; and selecting audio elements based on the user's predicted ratings.

In an alternate embodiment, the method for providing a customized radio broadcast to one or more users over a transmission media includes the steps of generating a user profile for each user; selecting audio elements for each user based on each user's user profile; forming an individual audio stream for each user from the audio elements; and transmitting the individual audio streams to the one or more users over the transmission media. Alternatively, audio elements may be selected based on the history of audio elements previously provided to the remote user. In yet another embodiment of the invention, audio elements may be selected based on a prediction of the user's ratings for different audio elements based on ratings from other users with similar ratings to related audio elements. In still another embodiment, the audio elements may be selected by the user on-demand.

The customized radio broadcast server of the present invention may also work with a processor-based communications device operable to receive audio elements over a transmission media. The processor-based communications device may be a personal digital assistant, a wireless communications device, or a personal computer.

In another aspect, the present invention comprises a method for overlapping stored audio elements in a system for providing a customized radio broadcast. Specifically, the method includes the steps of dividing a first audio element into a plurality of audio element components; selecting one of said audio element components; decompressing the selected audio element component; selecting a second audio element; decompressing the second audio element; mixing the decompressed audio element component with the decompressed second audio element to form a mixed audio element component; and compressing the mixed audio element component to form a compressed overlapping audio element component. The compressed overlapping audio element component may replace the selected audio component. The first audio element may be a song, while the second audio element may be a DJ introduction.

In yet another embodiment, the present invention provides an audio element cache. The audio element cache is capable of caching audio elements for each user. In operation, customized radio content is provided to remote listeners in a personal radio server system by: storing a plurality of audio elements in a file server; retrieving a subset of the plurality of audio elements from the file server by predicting the content desired by a remote listener based on a user profile of the remote listener; storing the subset of the plurality of audio elements in an audio element cache; selecting audio elements to provide to a remote listener from the audio element cache; and transmitting the audio elements to the remote listener. In an embodiment, the plurality of audio elements are stored in the audio element cache when a remote listener logs-on the personal radio server system.

In still another aspect, the present invention provides a method of generating a number audio element for playing a desired number in an audio system. Specifically, the method sets forth the steps of storing a plurality of audio elements used to represent a subset of the range of numbers; defining a plurality of match types used to determine if one or more matching audio element exists in the subset of the range of numbers; defining a plurality of accuracy prefixes representative of the error associated with any rounding of the desired number to be played; setting the accuracy prefix to a value representing an exact match between the desired number and a number audio element in the stored subset of audio elements representative of the range of numbers; filtering the audio elements to determine if an exact match exists; if an exact match does not exist, rounding the desired number to a pre-determined level of precision to create an estimated desired number; setting the accuracy prefix to a value representing the error associated with any rounding of the desired number to be played; filtering the audio elements to determine if an exact match exists between the estimated desired number and any of the plurality of audio elements used to represent a subset of the range of numbers; and repeating the steps of filtering until such time as an exact match has been determined between the estimated desired number and any of the plurality of audio elements used to represent a subset of the range of numbers. Once an exact match is determined, the number audio element is transmitted to a remote user.

The number audio element of the present invention may be a stock quote or an announcement of the time. Further, the number audio element may be transmitted in telephone systems, automated teller machines, or other audio system.

The present invention takes advantage of a method for efficiently comparing two trinary logic representations, including the steps of creating a first data structure (referred herein as a VALUE data structure) representative of a first set of properties; creating a second data structure (referred herein as a KNOWN data structure) representative of whether the first set of properties is known; creating a third data structure (referred herein as a TARGET data structure) representative of a target set of properties; creating a fourth data structure (referred herein as a WANT data structure) representative of whether the target set of properties is wanted; and comparing the first, second, third, and fourth data structures using bit-wise binary operations to determine whether the first set of known properties are wanted as a target set of properties. In exemplary embodiments, the bit-wise binary operation are performed according to the Boolean equation: (not WANT) or (KNOWN and ((TARGET xor VALUE))). Alternatively, the bit-wise binary operation are performed according to the Boolean equation: (not WANT) or (KNOWN and ((TARGET and VALUE) or ((not TARGET) and (not (VALUE)))). These data structures may be any size computer word, including 16 and 32-bit words.

BRIEF DESCRIPTION OF THE DRAWINGS

For a more complete understanding of the present invention and the advantages thereof, reference is now made to the following descriptions taken in conjunction with the accompanying drawings. In the drawings, depicted elements are not necessarily drawn to scale and like or similar elements may be designated by the same reference numeral throughout the several views.

FIGS. 17a–c show the data structures used in the determination of the content to provide a user based on the city where the user lives.

Figure 1:
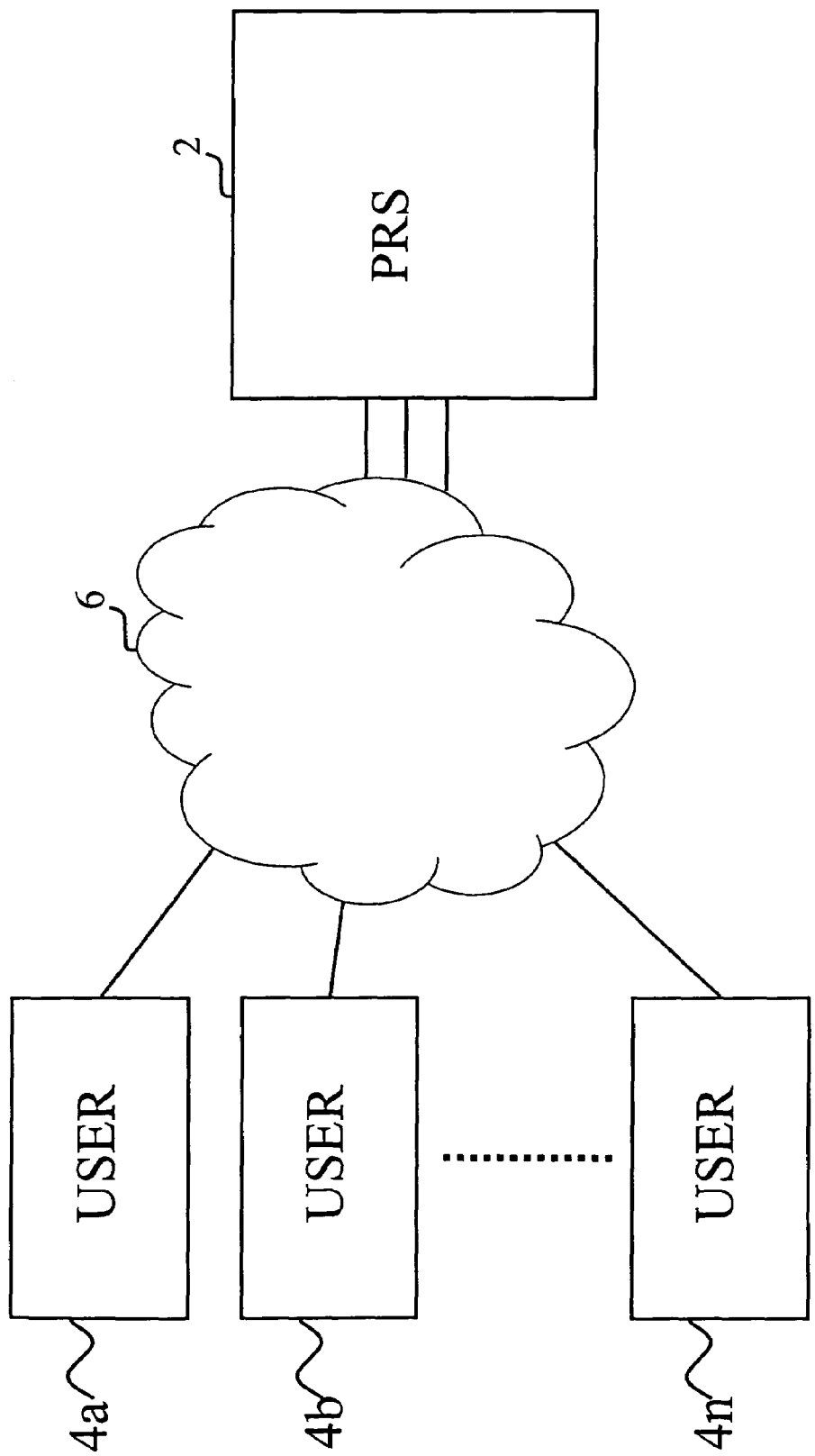
FIG. 1 shows a high-level block diagram of the personal radio system according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention.

DESCRIPTION OF ILLUSTRATIVE EMBODIMENTS

For purposes of defining the invention, the following abbreviations have been used throughout the specification:

| | |
|---|---|
| PRS | Personal Radio System |
| AS | Audio Server |
| AES | Audio Element Selector |
| FS | File Server |
| DB | Database |
| AE | Audio Element |
| AEID | Audio Element Identifier (also referred to as an "ID") |
| UP | User Profile |
| UPDB | User Profile Database |
| UPREG | User Profile Registration Record |
| UPDEM | User Profile Demographics Record |
| UPINT | User Profile Interest Info Record |
| UPHIST | User Profile History Info Record |
| UPFREQ | User Profile Frequency Preference Record |
| UPMP | User Profile Music Preference Record |
| EID | Enumeration ID |
| AST | Audio Server Thread |
| ASSMQ | Audio Server Shared Message Queue |
| ASTFQ | Audio Server Thread File Queue |
| AEDB | Audio Element Data Base |
| AESF | Audio Element Selection Function |
| UH | User History Record |
| US | User State |
| UP | User Profile |
| DJAESF | Disc Jockey Audio Element Selection Function |
| DJAE | Disc Jockey Audio Element |
| UAEC | User Audio Element Cache |
| DJSO | Disc Jockey Song Overlap Scheme |
| UPCM | User Property Compression Mechanism |
| TRIT | Trinary Property Representation |
| XLIST | Exclusion List Representation |

The present invention is described in relation to a personal radio server for providing customized audio content to listeners. Although the present invention is described in this context, it should be understood that the concepts disclosed herein would also apply to other forms of servers for providing broadcast content to remote users. For example, the present invention may be used to stream customized video to a remote user.

FIG. 1 illustrates a high-level block diagram of the interaction between users 4a–n with the personal radio server 2 of an embodiment of the present invention. The main function of the personal radio server 2 is to simultaneously produce individually customized radio programs for hundreds or thousands of end users. In an embodiment, the personal radio server 2 comprises a computer program running on a host server. More particularly, an embodiment of the system comprises a C++ program running on a Linux operating system on a 500 Mhz Intel Pentium III computer. A standard SQL back-end (e.g., MySQL or Oracle) is used for the persistent data storage. In an embodiment, the system is capable of supporting approximately 2,000 simultaneous users. Typically multiple such systems are clustered to create audiences of tens or hundreds of thousands. Although a particular embodiment of the personal radio server 2 is described using a C++ program with a SQL back end, it should be understood that the personal radio server software may be ported to other hardware platforms or architectures without departing from the scope of the present invention.

In operation, the personal radio server 2 provides to each user 4a–n a customized radio program that may consist of the following types of content:
- the user's favorite music, introduced by a user-selected DJ and in a manner of their choice
- talk by a user-chosen DJ (or group of DJs)
- news reports on topics that interest the particular user
- sports scores and reports for only those teams selected by the user
- ski reports for resorts where the user visits
- stock reports for companies the user has or wants to invest in
- weather in the user's local area
- traffic reports only on the routes the user takes
- advertisements for products and services that the user wants or frequently purchases
- school closings for only those schools that the user has an affiliation
- individual and group contests
- reminders that interrupt the running program with a message
- automatic alerts which are triggered by changes such as a drop in stock prices the user has, traffic jams on the user's particular routes, severe weather in the user's area, etc.
- informational and instructional content about the system itself
- "virtual requests" made by other users, but limited to requests for songs that the current user actually likes
- audio elements, such as jingles, that know and use the user's name (e.g., "Hey Fred, this is your radio station", or "Its time for Fred's stocks").

It should be understood that this list of content for the customizable radio system is merely intended to be illustrative. Other content may be customized and delivered in this manner without departing from the spirit and scope of the present invention.

The personal radio server 2 is attached to a network 6, which is accessible by many users (4a–n) through remote terminals. In an embodiment, the network 6 is the Internet, which is accessible by a significant percentage of the world population. Alternatively, the network 6 may be a local area or limited area accessible network. Users 4a–n connect to network 6 through a processor-based communications device. Each processor-based communications device includes software for interacting with the personal radio server 2 and for providing customized radio content to the user.

Figure 2:
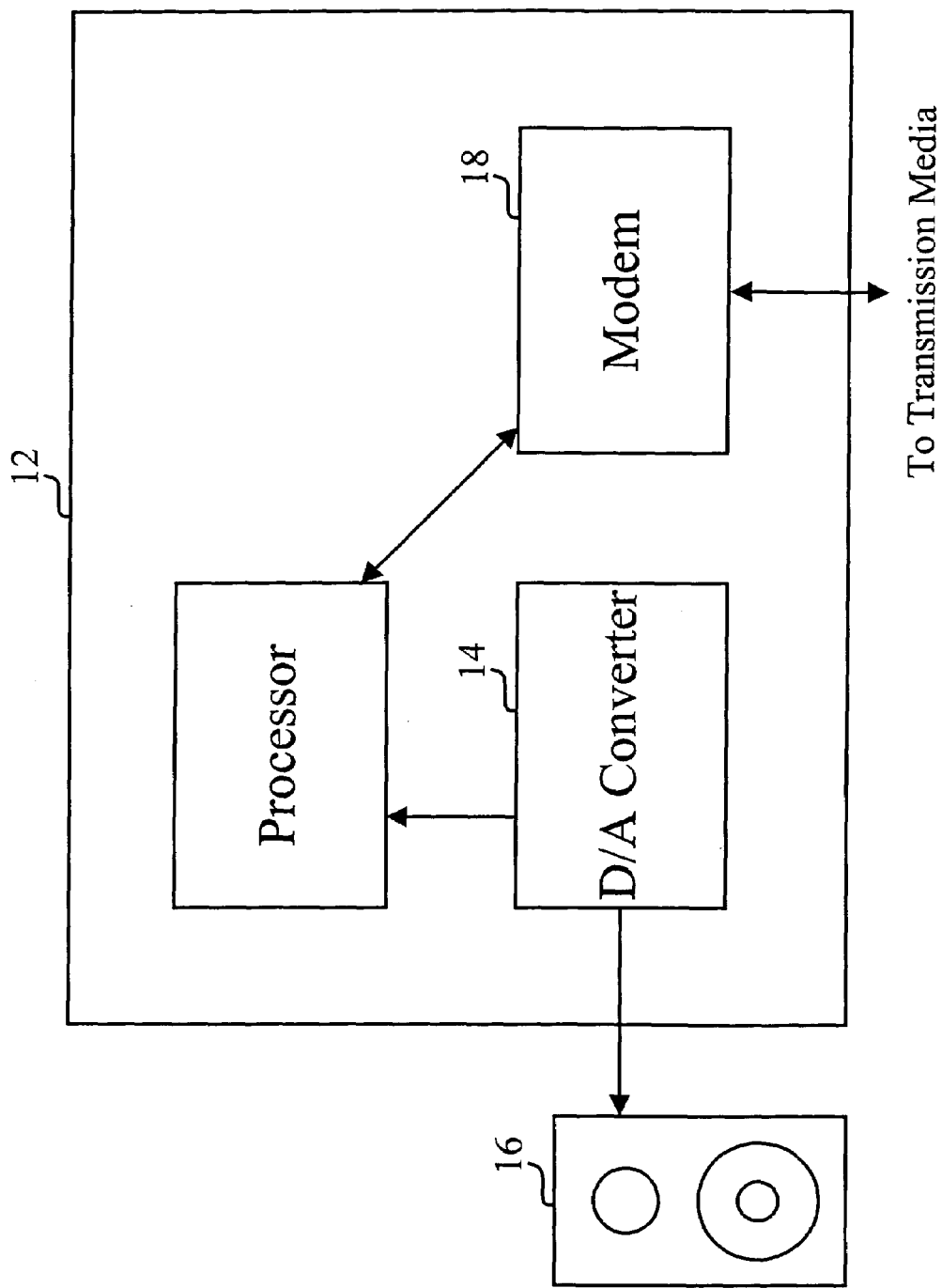
FIG. 2 illustrates the architecture of a remote terminal for receiving and playing radio broadcasts as part of the personal radio system of the present invention.

FIG. 2 illustrates a high-level block diagram of the architecture of a remote terminal 12 in an embodiment of the present invention. The remote terminal is used by the user to access the personal radio server 2. The remote terminal 12 will generally include a processor 12, a D/A converter 14, a speaker 16, a modem 18, and memory 20. In an exemplary embodiment, these components are part of a personal computer system that includes a sound card. Alternatively, these components may be included in a personal digital assistant (PDA), a cellular telephone, or other suitable processor-based communications device. The processor 12 executes software for providing the personal radio functions to a user. The software executes in memory 20 and controls operation of processor 12. In the illustrated embodiment, the radio broadcast signal is digitally encoded and transmitted to the remote terminal 12 via modem 18 over a transmission media. The processor 12 decodes the transmission and directs all radio broadcast signals to D/A converter 14, which then transmits the radio broadcast to a speaker 16.

Figure 3:
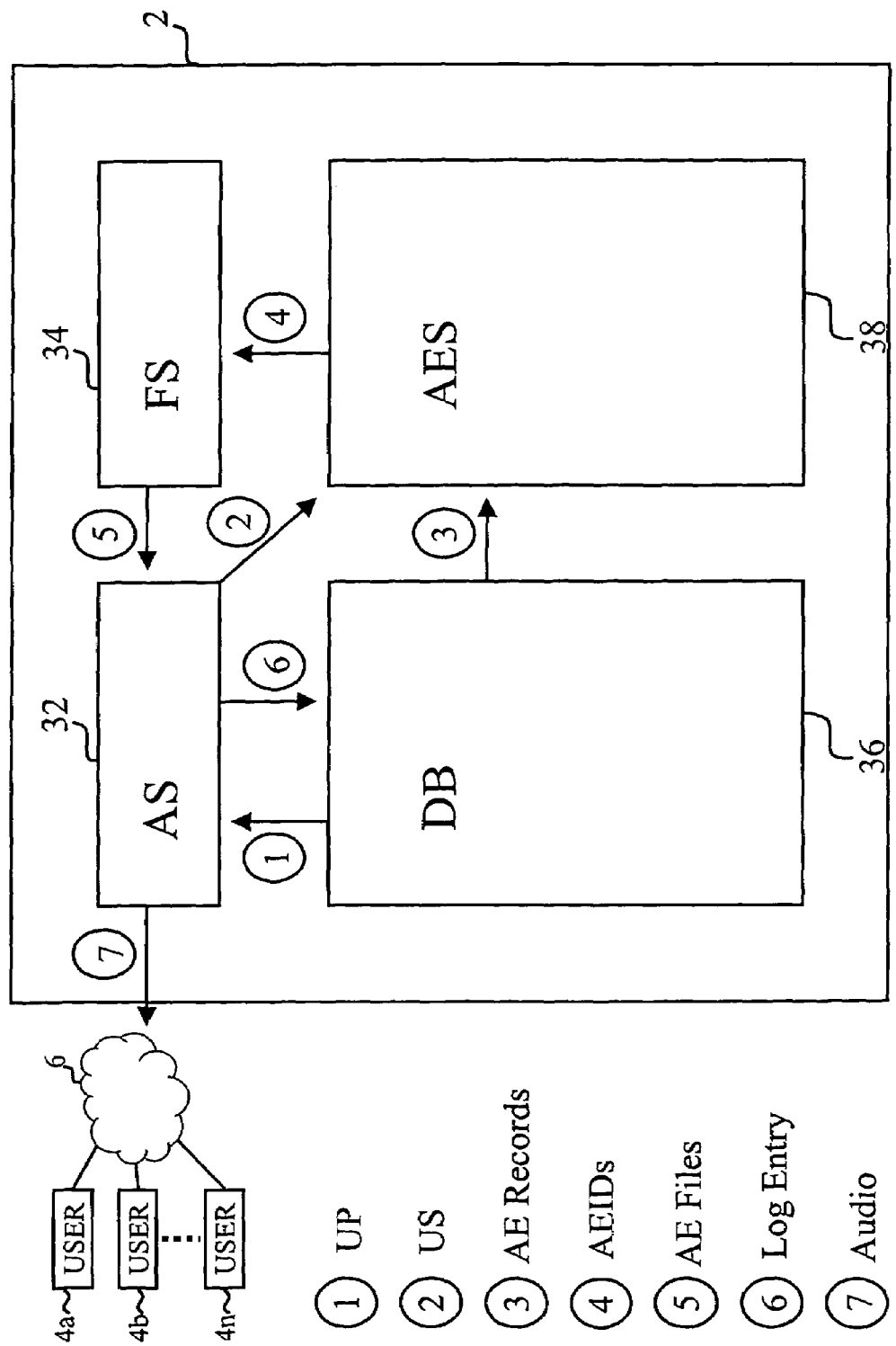
FIG. 3 illustrates a high-level block diagram of the personal radio server of the present invention.

FIG. 3 illustrates a more detailed high-level block diagram of the personal radio server system of the present invention. In an embodiment, the personal radio server 2 includes a computer system, or collection of computer systems, consisting of four fundamental components: a streaming audio server (AS) 32; a highly specialized audio element selector (AES) 38; a standard SQL or hierarchical database server managing specialized data tables (DB) 36; and a file server (FS) 34. FIG. 3 further includes an indication of data flow between each of these components. Specifically, database 36, or other data management system, includes user (listener) profiles (UP). These profiles provide the audio server 32 with specific information about the type of content to broadcast to the remote listener. The audio server 32 also interfaces to the audio element selector (AES) 38 and provides a particular user's current user state (US). The AES 38 uses the information provided from the user profile (UP) in database 36 and the current user state (US) to select the appropriate content to provide to the audio server. The database 36 also includes audio element records that identify the audio elements stored in the file server 34. Thus, the AES 38 selects and retrieves audio element identifiers from database 36. Then, the AES 38 provides the audio element identifier (AEID) to file server 34. The file server 34 selects the appropriate audio element (AE) that includes the desired content and provides it to the audio server 32 for transmission to the remote user. After providing the audio element to the remote user, database 36 is updated with a log entry to indicate the last audio element transmitted to the remote user 4. Each of these components is described in further detail below.

Figure 4:
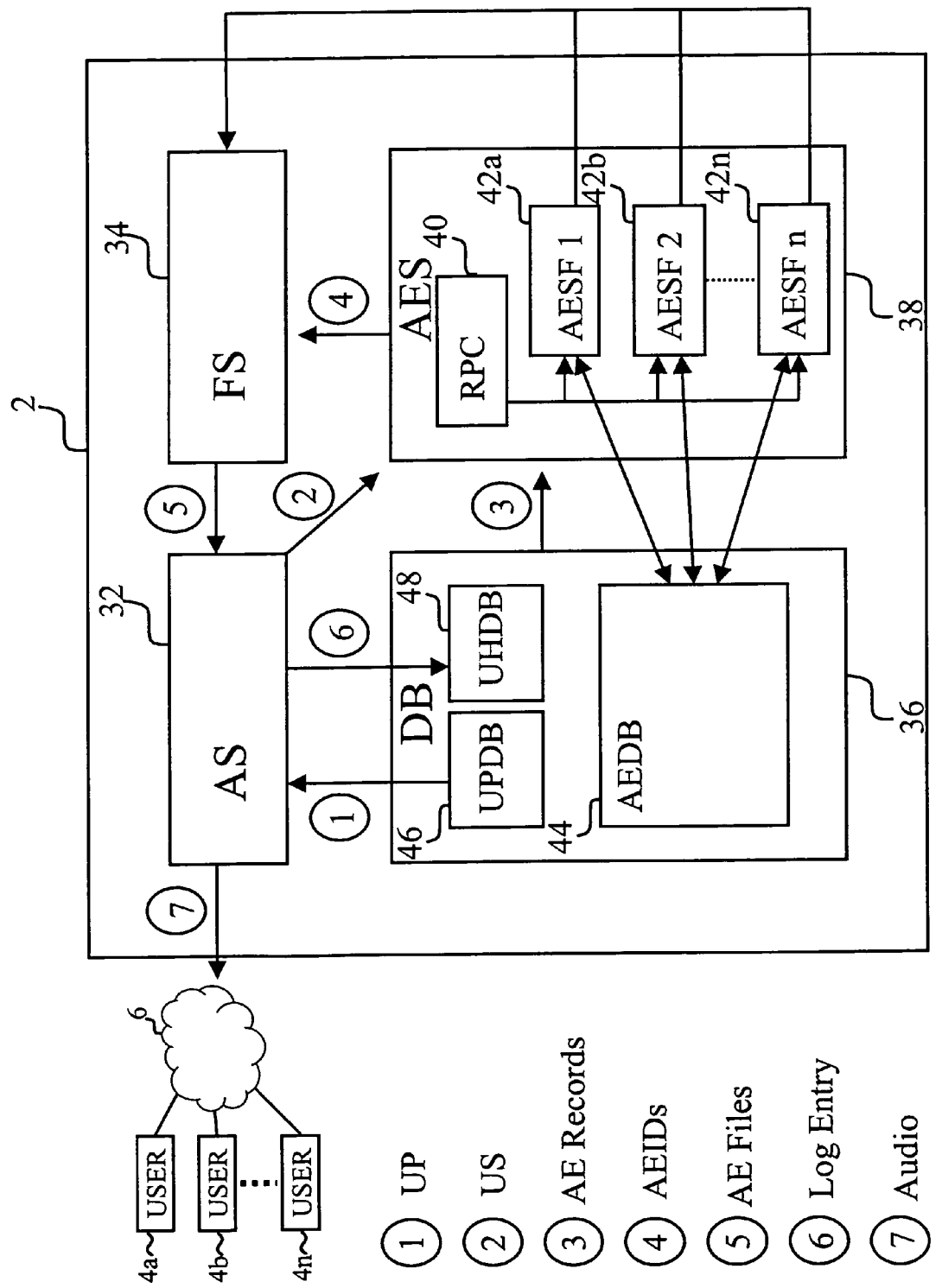
FIG. 4 illustrates a more detailed block diagram of the components of an exemplary personal radio server according to the present invention.

FIG. 4 illustrates a more detailed block diagram of the components of an exemplary personal radio server according to the present invention. Sections 1–4 below discuss further details relating to each component of the system.

1. Streaming Audio Server (AS)

The streaming audio server (AS) module 32 interfaces with the end user 4, the AES 38, DB 36, and the FS module 34. In operation, when the user 4 logs-on to the system, the software on the user's computer system, network appliance, or portable wireless-networked device initiates a connection to the AS module of the personal radio server. The user's system then requests the radio program for that end user using a standard communications protocol such as Hyper-Text Transfer Protocol (HTTP).

The AS module 32 then communicates with the DB module 36 to retrieve the user profile (UP) and the last user state (US) for the appropriate user from the UPDP 46. If the user has no profile (i.e., the first log-on for the user), a new UP is created and the user is issued a new user identification code and the US is set to a default initial condition. Next, the AS module 32 passes the user state and profile to AES module 38. It should be noted that in alternate embodiments, the AES 38 may request the UP directly from the DB module 36. After receiving the UP and US, the AES module 38 then uses the US and the UP to determine exactly which audio element or elements should be sent to the end user. With this information, the AS 32 requests the file(s) corresponding to the audio element(s) selected by the AES 38 from the FS 34.

The AS module 32 then transmits, via streaming or other suitable method of transmission, those files to the end user's system at the appropriate bit-rate. When the files have been almost completely streamed to the end user, the AS 32 requests additional audio elements from the AES 38 and the process continues so that the stream to user 4 is uninterrupted.

Although the present invention is illustrated using streaming data, it should be understood that other forms of transmitting audio content to a remote user may be used without departing from the spirit and scope of the present invention.

2. Audio Element Selector (AES)

The audio element selector (AES) module 38 is a highly specialized piece of software that interfaces with the AS 32 and the DB 36 modules. Internally, the AES module 38 includes a radio program clock (RPC) 40 and a series of special audio element selection functions (AESFs) (42a–n). The RPC 40 determines what type of audio element should be sent to the user next. Under control of the RPC 40, the audio element selection functions (42a–n) select the audio elements of each type that should be sent to the end user. In an embodiment of the invention, one audio element selection function exists for each type of audio element. For example, audio elements may include songs
introductions
news
traffic
weather
sports scores and game reports
stock prices, news
jingles and station identification
advertisements
school closings
reminders
instructions
time
date
talk/morning show
serialized radio programs The RPC 40 is designed to choose audio element types to achieve the frequency specified in the particular user's profile. For example, the user's profile may indicate that news should be played twice an hour, sports should be played once an hour, while traffic should be provided at the end of each hour. The user may manually select these user preferences. Alternatively, the user profile may be determined by using collaborative filtering, or selected by a radio programmer. The RPC is designed to optimize the radio program to have all the content types with the appropriate frequency, and to resolve conflicts when two types of content are supposed to occur at the same time (e.g., news and traffic report). The output of the RPC is the particular content type that should be sent to the end user next.

After determining the particular content type, the AES 38 runs the AESF (42a–n) that corresponds to the content type chosen by the RPC 40. Each AESF (42a–n) uses the user's profile and past listening history to select from the DB module exactly which audio elements should be sent to the end user. The AESF insures that disallowed combinations of audio elements are not played too closely in time. For example, the AESF may be programmed to prevent repeating the same news story, playing the same song, unintentionally playing songs by the same artist, and playing an ad for a product right after an ad for a competitive product. In an embodiment, this function is provided through the use of "Exclusion Lists" or "XLISTs," which may include one or more exclusion lists per type of audio element. The list stores the last N elements of that type which were played (where N is selected as appropriate). Information on the exclusion list is maintained as a queue. As new elements are added, the oldest elements are removed. The AESF can then check that for each new audio element whether the selected audio element matches certain properties of past audio elements (such as the artist in the case of songs). The XLISTs differ from the UHDB in that XLISTs may be formed over different types of audio elements. For example, an XLIST may be created based on the artists played to a particular listener to prevent hearing the same artist within a predetermined number of songs. Other examples of XLISTs that may be created are for artist gender to ensure variation of artist gender from song to song.

In addition to determining whether the particular combination of content type is appropriate, the AESF (42a–n) guarantees that the selected audio elements are appropriate for the end user (i.e., the user's preferred DJ, the users desired stocks, etc.). In some cases, the AESF composites multiple audio elements to generate the desired audio (i.e., the stock price "123⅝" may actually be represented by audio elements "123" and "⅝"). Alternatively, the audio may actually be represented in an alternate format. For example, the stock price of "123⅝" may be represented by multiple audio elements in an alternate format (for example, the audio elements may include "almost," "124," and "¾," or even "about" and "125"). For a more complete description of the software for performing this type of alternate representation format, see FIG. 14 and the accompanying discussion.

3. Database (DB)

In an embodiment, the database module 36 consists of a standard SQL or hierarchical database. It should be understood, however, that any data management system may be used without departing from the spirit and scope of the present invention. Within the data base, several data tables are maintained: an audio elements database (AEDB) 44, a user's profile database (UPDB) 46, and a user's history database (UHDB) 48.

The Audio Element database 44 includes one or more tables 36 that enumerate the "meta-properties" for each of the audio elements stored in the FS module. A "metaproperty" is additional information that may be associated with an audio element, including information related to:
- the type of audio element
- the date the audio element was recorded
- the expiration date for each audio element
- the jock who recorded the audio element
- the city referred to in the audio element (if any)
- the user name referred to in the audio element (if any)
- the product type being advertised in the audio element (if applicable)
- the artist who performed the song contained in the audio element (if applicable)
- the artist who wrote the song contained in the audio element (if applicable)
- the companies referred to in the audio element (if applicable)
- the sports teams referred in the audio element (if applicable)

These meta-properties allow the DB 36 to select only that content which is appropriate for a given user, content-type, and situation. For example, some of the meta-properties associated with a news audio element are Type, City, and DJ. The DB module can be used by the AES to find all news elements that have a Type that the user is interested in, have a City that matches the user's home city, and have been read by the user's preferred DJ.

4. File Server (FS)

A standard file server 34 or any dedicated network data storage device may be used for storing the audio elements. In an embodiment, files on the file server are organized for rapid retrieval by the AS when given the audio element identification retrieved from the DB 36 and chosen by the AES 38. Each audio element (AE) is stored as a compressed audio file. In an embodiment, AE's are stored in MPEG 1 Layer 3 (commonly known as MP3) format at 20, 48, 64 and 128 kbps. Each AE may include between 0.25 seconds to 3 minutes of content depending on the type of AE. For example, a "company name" AE may be 2 seconds long, but a long news story may be a minute. Similarly, "song" AE's may be several minutes long.

Figure 5:
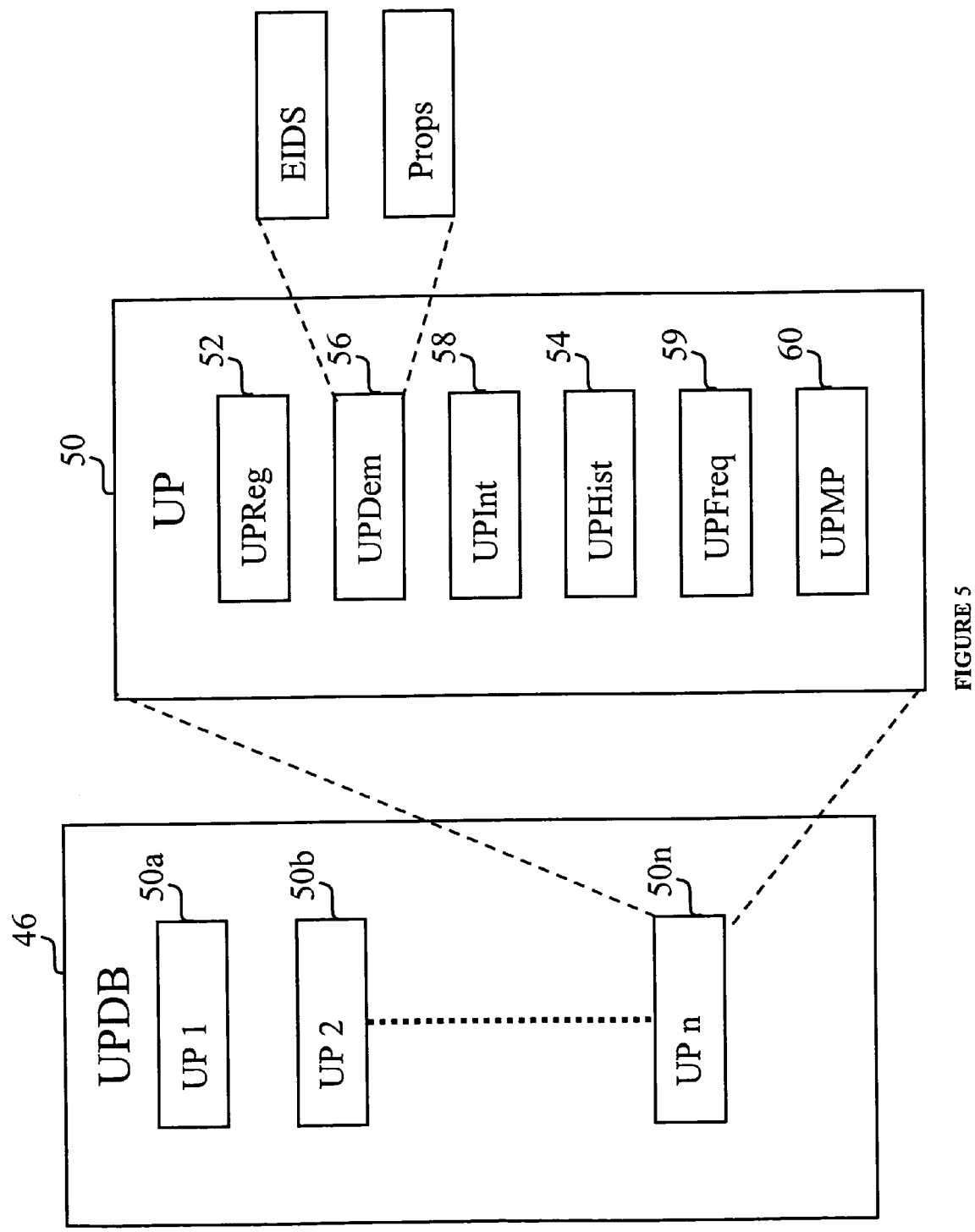
FIG. 5 shows a more detailed block diagram of the components of the User Profile Database (UPDP) according to an embodiment of the present invention.

FIG. 5 shows a more detailed block diagram of the components of the User Profile Database (UPDB) 46. According to an embodiment of the present invention, for each user of the system, a Dynamically Adaptive User Profile (DAUP) (50*a–n*) (also referred to as the "UP") is stored within the database 46. The DAUP (50*a–n*) is a data structure stored in the DB 36 and used by the AES 38 to select the content that is most appropriate for the particular user based on the data stored in the user profile. This data may include, but is not necessarily limited to, data relating to a user's preferences for particular songs, types of news (e.g., international, business, etc.), or particular sports teams. Each listener's DAUP is dynamic in that the information in the database changes gradually as the user volunteers information about his or her preferences. The user can provide this information in many ways. For example, the listener may be able to dynamically rate a record or product via a web page during the transmission of a related audio element such as a song or advertisement as described in more detail below.

As shown in the exemplary embodiment in FIG. 5, each entry in the DAUP 50 may be divided into several components: initial registration information (UPREG) 52, information on content balance and frequency (UPFreq) 59, information on demographics (UPDEM) 56, information on interests (UPINT) 58, information on music preferences (UPMP) 60, and information on the user's profile history (54). When the user first logs in, the UPREG 52 for the DAUP is derived from a small set of initial questions. In an embodiment, the user is asked for his first name and an identification of "radio station" from a list of available formats. For example, exemplary radio formats may include "80's rock" or "contemporary country." Both at the initial log in, and subsequently, the user may specify additional properties. For example, the user may initially be requested to identify their zip code, preferred greeting (i.e., a first name or nickname), gender, age, favorite sports teams, or stock watch list.

The UPFreq 59 portion of a UP entry 50 in the UPDB 46 contains information relating to the content the user prefers in a radio broadcast. According to an embodiment of the invention, the user may control the balance between different content types by modifying the information in the database. The UPFreq 59 is a record within the DAUP 50 that takes the form of a set of frequencies—one frequency for each content type. For example, the non-advertisement portion of the broadcast might be divided to provide 80% music, 10% talk, and 10% news during a radio broadcast. In an embodiment, the user may not control the frequency of the advertisement portion of the broadcast. For example, an exemplary system may require the PRS to provide a user with 8 advertisements per hour.

In an embodiment, the user may be provided direct control over these frequencies via a web page. Alternatively, the user can be asked to select from a set of alternatives such as "mostly music, not much talk," "lot's of jokes, and stories," "serious listener, introduce and describe the songs," "extra sports news," or "more traffic and weather please." In each case, the frequency of content type may be tailored to better suit the particular listener.

The UPDEM 56 portion of the database stores demographic information relating to each user. For each user, the AESF 42 that corresponds to the particular user will tailor advertisements (and some other types of content) to the particular demographics of the user. For example, the AESF may provide a commercial for luxury automobiles to a user that lives in a particular zip code, while the AESF may select a commercial for pick-up trucks to a different zip code. In an embodiment, the UPDEM 56 is a record within the DAUP 50 that takes the form of a set of binary and enumerative variables. The UPDEM 56 represents conventional demographic information about the user such as income, city, sex, age, etc. The UPDEM 56 may also include other information that is designed to help the PRS target content to a user based on the user's demographics. For example, other information that may be included in the UPDEM 56 includes categories such as "interested-in-purchasing-computer," "car owner," "home owner," etc. In an alternate embodiment, the user may be able to edit the information in the UPDEM through a user interface. In addition, the PRS may incorporate demographic information relating to a listener from a secondary source such as "Double-click" or "Engage."

The UPHIST 54 portion of the UP stores the history of the user's states. In particular, the UPHIST may be used to retrieve the last User State (US) for a particular user when the user logs into the system.

The UPINT 58 portion of the UPDB 46 allows the user to specify a list of "interests" that relate to topics that the listener would like to hear more about. In an embodiment, the UPINT 58 is a dynamic length list. The UPINT stores a list of the user's favorite sports teams, stock holdings, roads used to drive to/from work, favorite vacation destinations, etc. This information is used to further customize the PRS broadcast. For example, the user may specify a particular interest in a few sports teams. Based on this information, the sports news segment broadcast to a particular user will mention only those teams in which the user is interested. In addition, a stock report may be tailored to give the prices of the user's stock as well as news reports that bear upon the particular stock. Similarly, the traffic report may only report delays on roads used by the particular user. The weather report may be configured to only mention local weather, as well as the weather in the user's favorite vacation spot. In an embodiment, the user's interest information is developed by allowing the user to select from among a checklist of choices.

Alternatively, the user's interest information may be obtained by allowing the user to navigate through a directed acyclic graph (DAG) of interests. The DAG includes interests in a parent-child hierarchy. For example, "Yankees" may have "New York City" and "baseball" as parents, and "Steinbrenner" and "Babe Ruth" as children. A user could choose to add any of those to their interests, or could edit any of the parent or children elements. For example, by selecting "New York City," the user would be allowed to pick from its parents—{New York State, "state," "big U.S. cities"} and its children—"Statue of liberty," "Manhattan," "NYSE," "Wall Street," etc.).

The UPDB 46 may also include the user's music preferences in a separate portion of the database called the UPMP 60. The UPMP stores song ratings entered by the user. Ratings from many users may be combined to predict ratings for new music, a process known as "collaborative filtering." Collaborative filtering involves storing a dynamic set of records associated with each user, one record for each rated song, and based on a small set of user song ratings stored in the UPMP 60, the user's rating of other songs may be predicted. In operation, the collaborative filtering process works by comparing a user's ratings to the ratings of other users in the database. If two users generally agree on many songs (i.e., the users both either dislike or like the same songs), then they are likely to agree on other songs. Thus, the PRS can predict, based on users with similar tastes in music, how a user will rate a song. Thus, based on this information, the PRS may select the content for a particular user based on this collaborative filtering process.

In an embodiment of the collaborative filtering system of the present invention, the PRS system 2 will utilize data from a group of paid raters, referred to herein as "trendsetters." The trendsetters may be paid to rate many songs in their area of interest. Each trendsetter will be compared to the current user. Thus, based on the trendsetter, or trendsetters, that are most similar taste to the user, the PRS may predict the future user ratings. In an embodiment, the AESF may be configured to select songs for a particular user that are highly rated by those trendsetters that most closely represent a user's interests.

To further support the collaborative filtering process and the gathering of information for each user's UPDB 46, a user may provide feedback on a song by song basis. For example, in an embodiment, the present invention increases the amount of user feedback by adding software or hardware buttons to the playing device. These buttons may include feedback information such as "Great Song!," "Pretty Good" ". OK Song" "Not so hot," and "Yuk, don't play that again." Thus, the displayed software buttons allow the user to easily rate the currently playing song.

In some cases the user may be unwilling to give song-by-song feedback. One format for painless feedback is the station change button of a graphical user interface of the present invention. According to an embodiment, at any point during a broadcast session, the user will be able to "change stations," either to another format, or to a similar format which is in a different state (i.e., perhaps playing a different song). The UPMP 60 stores data relating to this station change behavior and attempts to find a correlation with particular songs.

Although the feedback process and the collaborative filtering process are discussed in relation to music content, it should be understood that the feedback process may be used for any type of content. For example, this feedback process may be used to select various talk shows, advertisements, or other types of audio elements.

Figure 6:
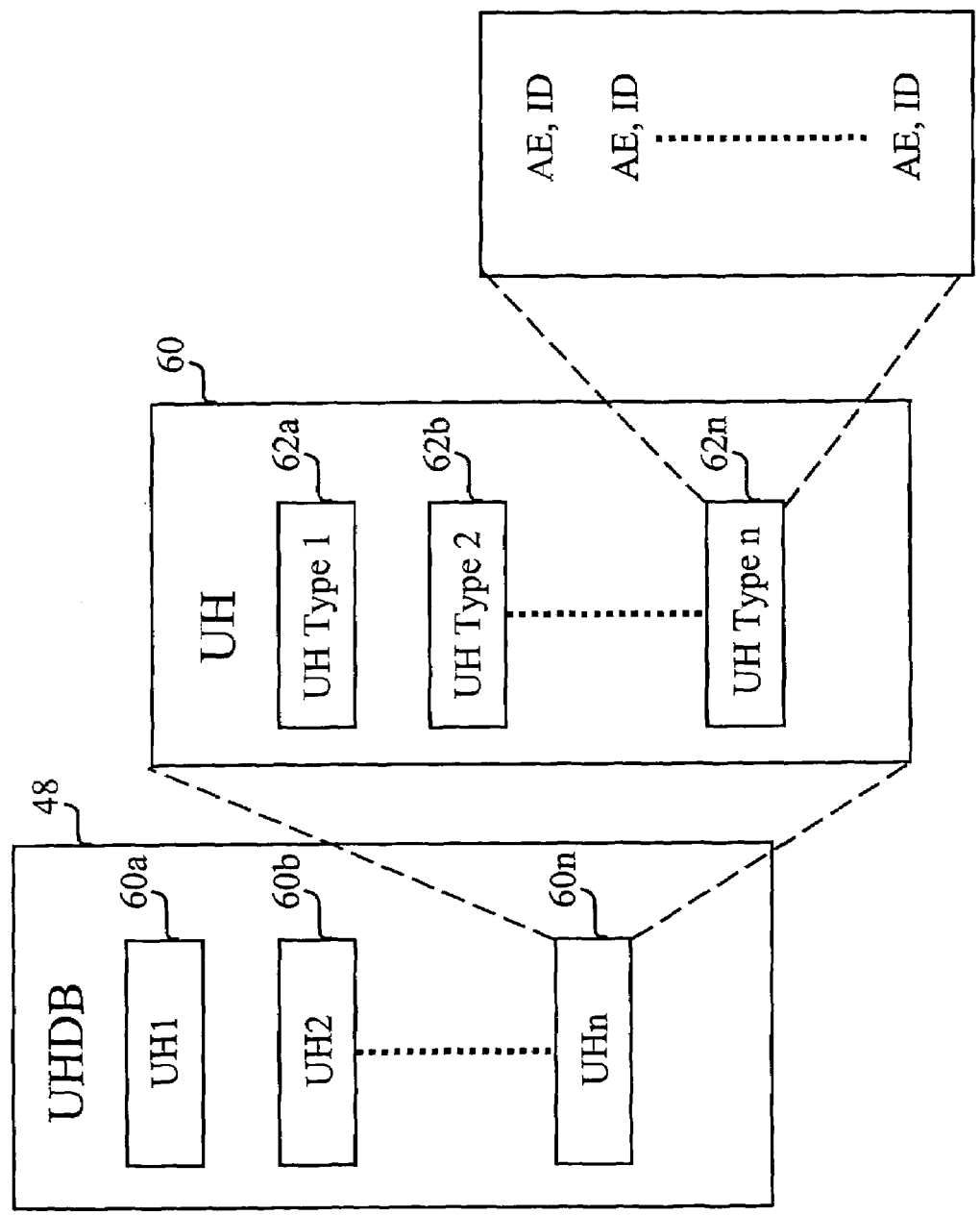
FIG. 6 is a diagram of the records and components in the User History Database according to an embodiment of the present invention.

FIG. 6 shows a more detailed embodiment of the user history database (UHDP) 48. In an embodiment, the UHDP 48 includes user history records for every user of the system. Each user history (60a–n) includes data for the user of the system relating to the broadcast content received by the user while logged-in to the system. In an exemplary embodiment, each set of user history records (60a–n) is organized in a hierarchical manner such that each user history includes records relating to the various "types" of content (e.g., news, music, etc.) (62a–n) provided by PRS. Within each "type" record, a record is maintained for the time the particular content was played, and an identification number ("ID") for the particular broadcast content. In this manner, the UHDP maintains a record of all audio elements played to a user, and when the audio element was played.

By maintaining a list of all audio elements played, and when the elements were played, the present invention may customize future broadcast content based on past listening patterns. For example, if the user continually interrupts their audio program to jump to the traffic around 4:30 p.m., the system may automatically schedule transmission to that user of an audio element that includes traffic information at 4:30 p.m. Other examples arise from more subtle trends. For example, if the user tends to give positive feedback for mellow songs and negative feedback for active songs in the morning, and then does the reverse in the afternoon, the system may automatically vary the distribution of music accordingly.

Figure 7:
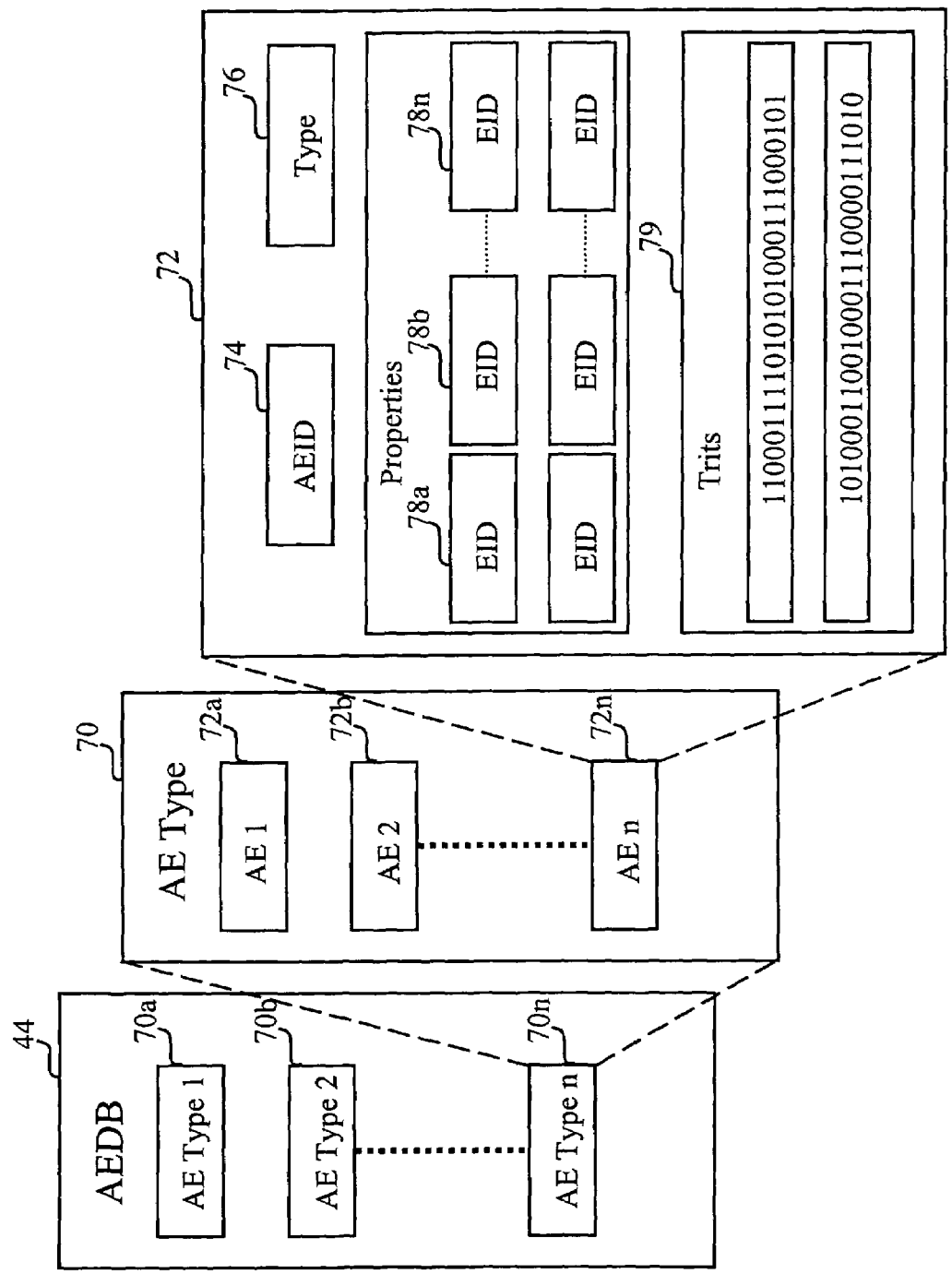
FIG. 7 illustrates an Audio Element Database (AEDB), which contains a record of the audio elements (e.g., music, disc jockey intros, news, etc.) available to provide to a user.

FIG. 7 illustrates another component of the DB 36 according to an embodiment of the present invention. Specifically, DB 36 includes an Audio Element Database (AEDB) 44 that contains a record of all the audio elements (e.g., music, disc jockey intros, news, etc.) available to provide to a user. In an embodiment, the AEDB 44 consists of a number of audio element records (70a–n) stored by the type of audio content. Each audio element type record includes a number of audio elements (72a–n) of the same type. For example, the audio elements may include introductions for a particular song from a number of different disc jockeys.

In an embodiment, each audio element (72a–n) may include an ID 74, a type 76, one or more enumeration ID's (78a–n), and a binary property list 79. The ID 74 provides a unique identification number for each audio element. The type 76 provides information relating to the type of content in the audio element. Each audio element may include one or more enumeration ID's (78a–n), which identify the particular demographic information to which the audio element pertains. For example, the EID may include an indication of a city to which the audio element pertains (e.g., a weather forecast for the city of Austin). Additionally, the audio element may also include many "yes/no"-type binary properties 79. These properties can be efficiently stored and compared using a special mechanism called the TRIT representation, described below. The properties 79 of the audio elements allow the DB 36 to filter out content that is not appropriate for a particular user. In addition to the "city" EID, other exemplary EID's may include the user's favorite DJ or type of news.

Figure 8:
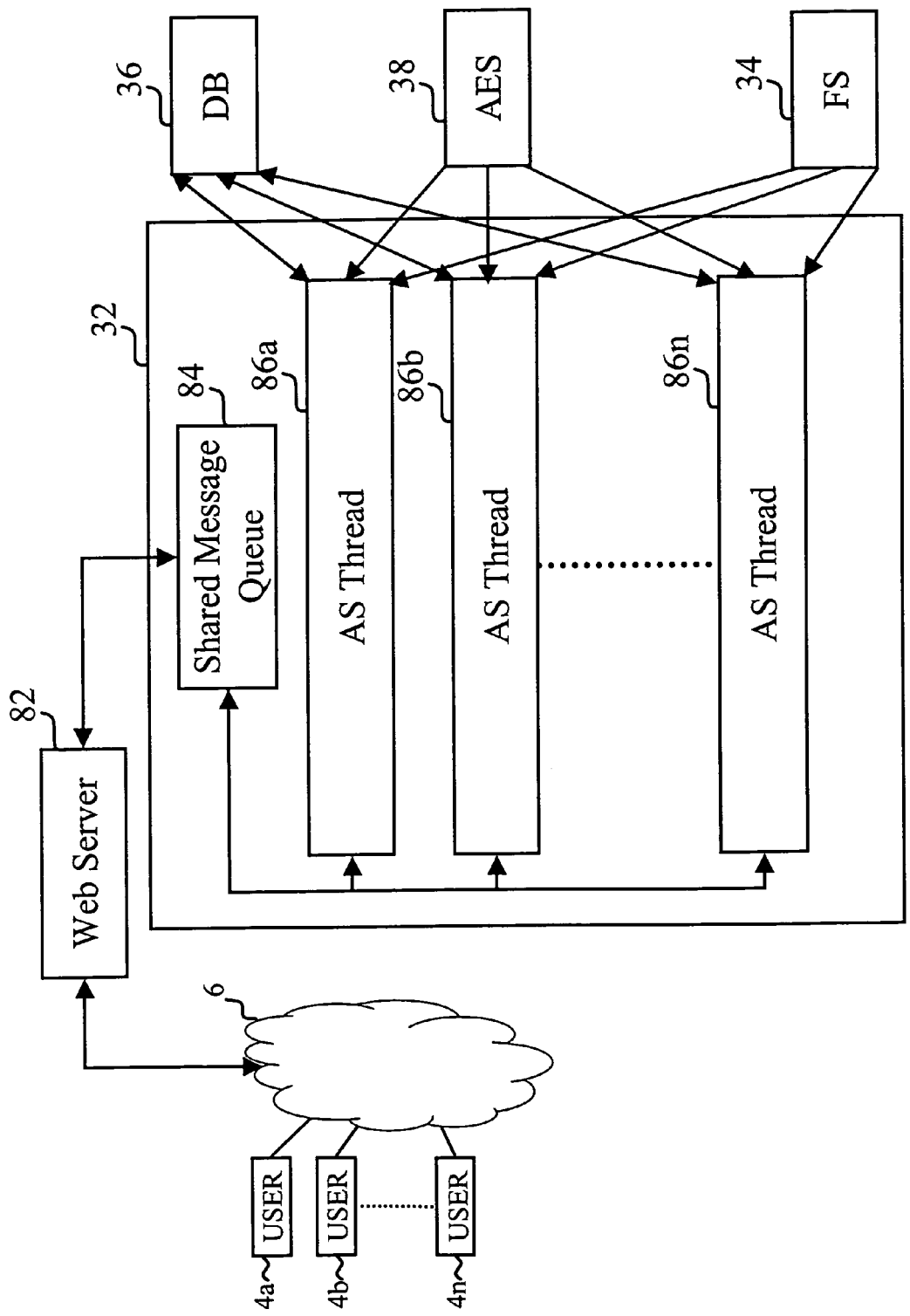
FIG. 8 shows a more detailed block diagram of the components of an audio server of the PRS according to the present invention.

FIG. 8 shows a more detailed block diagram of the components of an audio server 32 of the PRS according to the present invention. Each user 4 interfaces to the PRS via a network 80. Once again, the network 80 may be the Internet, a WAN, or any other suitable transmission media. All communication with the running system occurs via a standard web server (WS) 82 or an alternative input/output portal. The web server negotiates user interface and input verification. Information that needs to be passed to the running AS is passed into the AS shared message queue (ASSMQ) 84. The ASSMQ listens for connections from the WS. When a connection is received, one of several messages can be passed to the ASSMQ. Such messages include "skip to next element," "song feedback," "jump to traffic," etc. The ASSMQ is then queried by the individual Audio Server Threads (ASTs) that are executing for each user. Each AST checks the queue for messages destined for the program it is generating. When a message is found, it is removed from the queue, and the instructions are followed by the AST, potentially causing modification to the course of the audio stream. For each user that has logged in to the PRS, the audio server 32 creates an audio server thread (AST) 86a–n. Each audio server thread is a separate process executing in the audio server 32. An audio server thread is responsible for maintaining and managing each radio broadcast session for a user by communicating with the DB 36, the AES 38, and FS 34.

Figure 9:
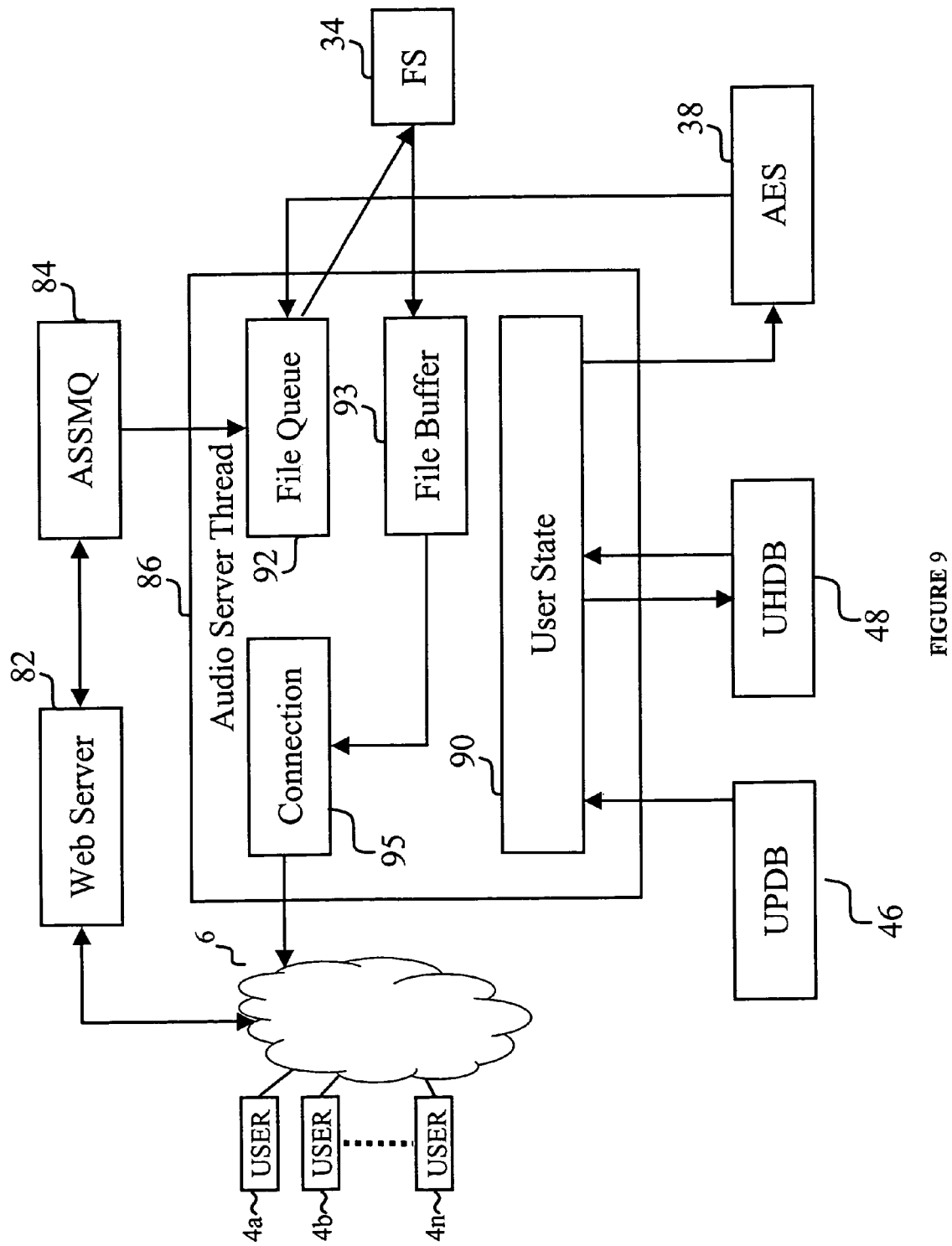
FIG. 9 shows a more detailed block diagram of an audio server thread according to an embodiment of the present invention.

FIG. 9 shows a more detailed block diagram of an audio server thread (AST) 86. The AST is typically composed of 4 parts: a connection 95, a User State 90, a File Queue 92, and a File Buffer 93. Within each AST, a connection 95 is maintained with the end user using some transmission medium. In a preferred embodiment, this medium is wired or wireless IP; however, any other communications medium and protocol can be used. Along this connection, the uninterrupted stream of compressed audio is transmitted to the user. Each AST maintains a User State (US) 90 for the connected user. Within that state, information about the users preferences and the users listening history, are maintained. Upon initial connection, the user profile information for that user is gathered from the UPDB 48. Information about the user's prior listening history is gathered from the UHDB 46, and as the user receives new audio, this is incorporated into the users listening history. Upon termination of the listening session (i.e. when the user 'logs off'), the listening history from that session is added to the UHDB 48. During the listening session, the AST passes the current user state to the audio element selector (AES) 38, which uses that information to select audio elements (AE's). The selected AE's are then passed back to the AST where their associated filename is queued in the File Queue. File names are then sequentially pulled off the File Queue, and the files are read in from the file system (FS) and buffered in the File Buffer 93. The File Buffer 93 is then sent across the connection 95 via a transmission medium to the end user. As the File Buffer 93 empties, another filename is pulled off the File Queue. When the File Queue empties, another request is made to the AES.

Figure 10:
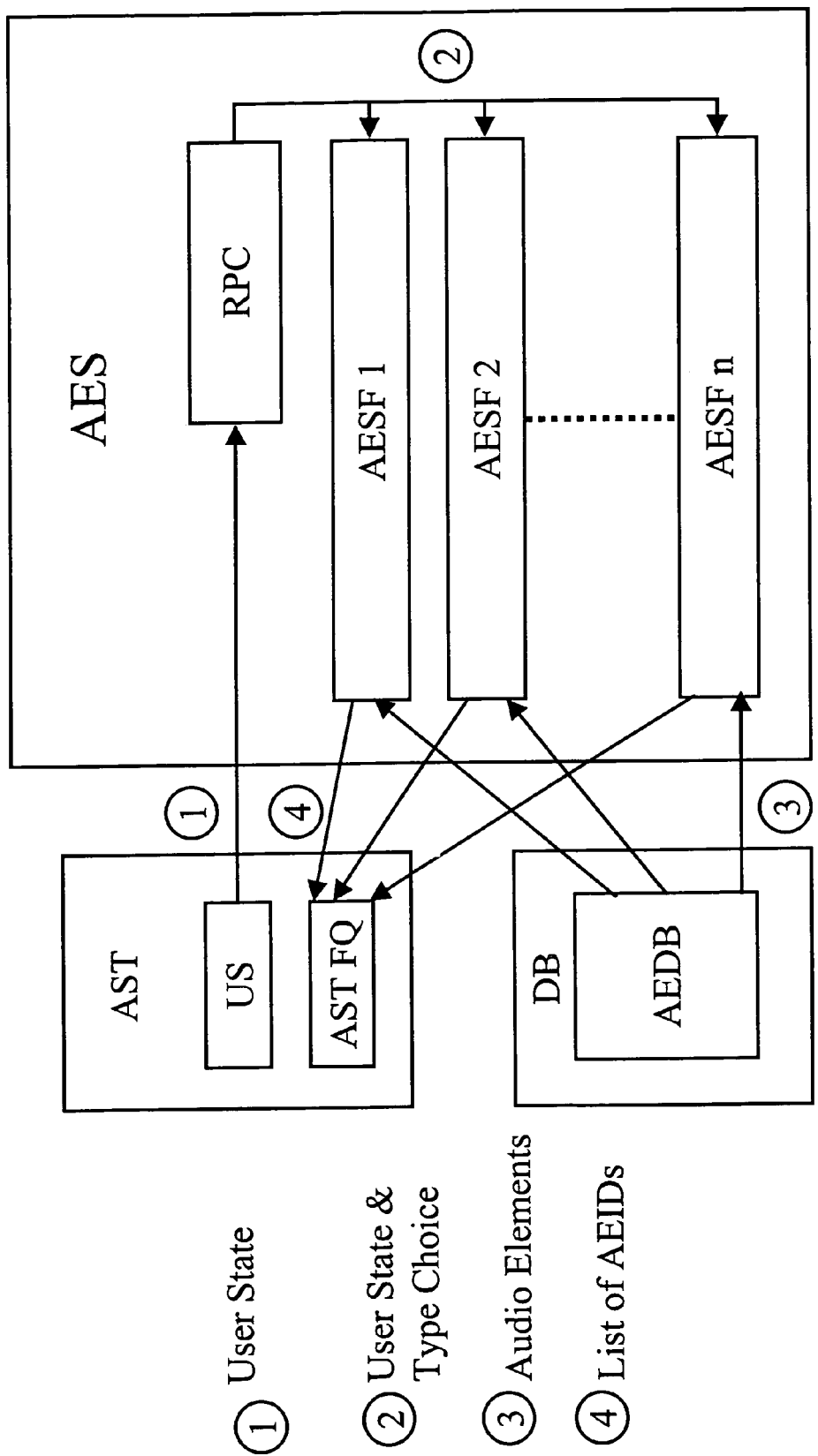
FIG. 10 shows a block diagram for the Audio Element Selector (AES), its constituent Radio Program Clock (RPC) and Audio Element Selector Functions (AESF's), and their connections to the Audio Server Thread (AST) and Audio Element Database (AEDB).

The AES 38 is shown in detail in FIG. 10. The AES selects an appropriate audio element by first choosing the type of audio element, then by calling the appropriate constituent Audio Element Selector Functions (AESF's) in the AES 38 to select the AE from the AEDB. First, the Radio Program Clock (RPC) within the AES uses the current User State (US) 90 and User Profile (UP) from UPDP 46 to determine the next type of AE to send to the user. The RPC bases its decision upon the current US (which contains information about how many times each type of AE has been sent to the user) and the UP (which contains user preference information about how many times per hour the user wants each type of AE sent to them). The RPC then determines the next AE type to be sent to the user. When multiple types of AE's are appropriate, an embodiment of the invention uses a static preference ranking over AE types to determine which AE type to send. Other possibilities for resolving this situation include random selection or user set priorities. Once the RPC has chosen an AE Type, the AES executes the appropriate AESF. The AESF then uses the UP to select AE's that are appropriate for the user. The AESF then removes AE's that are excluded by the XLISTs in the US. The AESF selects one or several AE's and sends their ID's to the AST, where they are queued in the AST File Queue (ASTFQ) 92 for sending to the user as described above.

Figure 11:
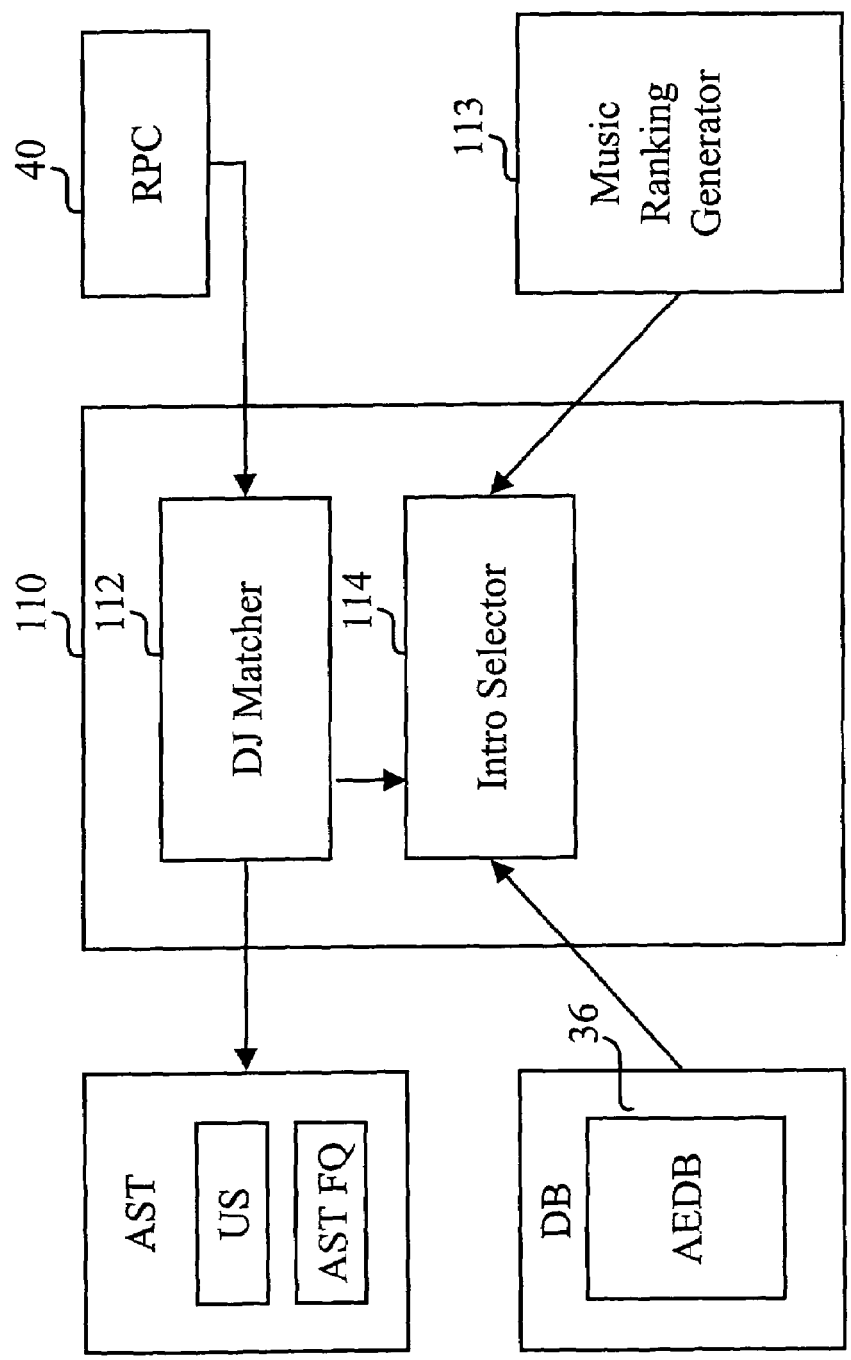
FIG. 11 illustrates a portion of the Audio Element Selector (AES) function that relates to the selection of a Disc Jockey Introduction for a song.

FIG. 11 illustrates another aspect of the PRS System, and specifically, a portion of the Audio Element Selector (AES) function. In an embodiment, the AES is configured to provide a Disc Jockey Audio Element Selection Function (DJAESF). Specifically, FIG. 11 provides a high-level block diagram of the AESF providing a disc jockey (DJ) intro to a particular song. Although the AESF is being illustrated as a DJ intro using the DJAESF, it should be understood that other types of audio element selection functions may be created without departing from the scope of the present invention. For example, other audio element selection functions may include the selection of news introductions, song "outroductions" (which follow the song), or other suitable audio segments.

As illustrated, the DJAESF is a software system that allows for the creation of a radio program in which particular music and informational content may be chosen independently of the DJ who introduces the broadcast content. In other words, a given user may control the music, news, and advertisement content through the user's profile, and independently select the DJ that the user wants to introduce the content. In this manner, the user can customize the radio broadcast by selecting the DJ. And because the DJ is an integral part of any radio program, providing the "glue" that holds the program content together by introducing songs, news segments, time, weather, and other components, the radio broadcast becomes more personal. Accordingly, the user builds a personal affinity to radio programs created by the personal radio server.

The various DJ audio elements (DJAE's) are stored within AEDB 36 and FS 34. For example, DJAE's may include audio elements relating to Song Introductions, Song "Outroductions" (which follow the song), News Introductions, News Wrap-ups, Jokes, and other audio segments like stories, serialized "shows" (i.e. the morning show), and various other types of audio elements. Unlike conventional radio broadcasts, the DJAE are recorded by the DJ off-line, before the construction of the personal radio broadcast. In the case of song introductions, jokes, introduction of news, and some other segments, these DJAE's may be recorded well in advance. In the case of more topical content like serialized shows, the DJAE's may be recorded that morning or a few days before. Still other types of content, like news stories, may be recorded just before broadcast.

In operation, the DJAESF selects the appropriate DJAE from the DB (e.g., a particular song should be preceded by an introduction of the song, the outroduction of a particular song, etc.). This selection is made based upon the type and specific content of the DJAE.

In an embodiment, information about each DJAE is represented in a uniform fashion across DJ's. For example, in the case of a song introduction, the information about the recording DJ, the song, and the type of introduction is stored with the DJAE. When selecting an introduction to precede a given song, the DJAESF is free to select a DJAE that matches the song and introduction type. In this manner, the DJAESF may easily replace one DJ for another throughout the broadcast.

The user may specify his or her DJ preference either by selecting from a fixed list of available DJ's or by providing generic information about the user's DJ preferences. This information is then stored in a user profile. This mechanism is more general than a simpler scheme in which the user simply selects a particular DJ. For example, a classical music listener may wish to hear very detailed historical descriptions of each classical piece. It may not be the case that any single DJ has recorded the detailed historical introductions for every classical piece that may be broadcast. However, the DJAESF may use the user's profile information to select an introduction based on the "type" of DJ desired rather than a specifically selected DJ.

Once again, FIG. 11 illustrates a specific application of the DJAESF. Specifically, FIG. 11 describes the high-level operation of the selection of a DJ introduction to a song according to the DJAESF of the present invention. Specifically, the DJAESF 110 includes a DJ Matcher 112 and an Introduction selector 114. The DJ Matcher 112 is a filtering function that eliminates from contention all AE's that do not have an appropriate DJ introduction as per current user's preferences (stored in UPDB 44) and the music content that is going to be played (as stored in the AEDB 36). Once the remaining set of appropriate introductions is determined, the Introduction selector 114 selects the DJ introduction from the AEDB 36. The introduction is then sent to the AST where it is placed on the AST File Queue (ASTFQ). The Music Ranking Generator 113 in FIG. 11 is the portion of the system that computes a songs rating based on collaborative filtering.

Figure 12:
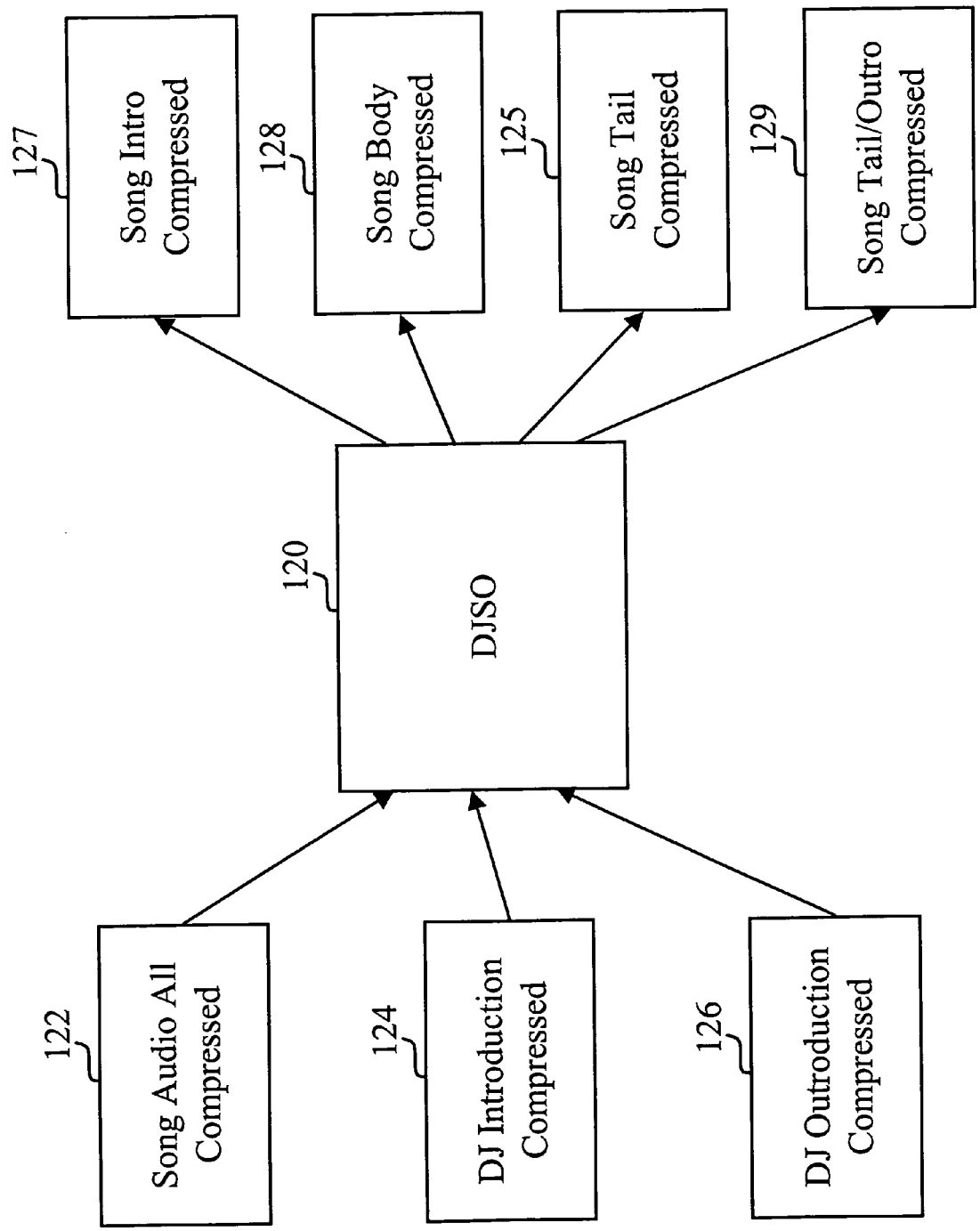
FIG. 12 shows a block diagram of the Disc Jockey Song Overlap Scheme (DJSO) according to an embodiment of the present invention.

In an alternate embodiment, the PRS may be configured to play the Disc Jockey introduction or "outroduction" over the beginning or end of a song. FIG. 12 shows an embodiment of the Disc Jockey Song Overlap Scheme of the present invention. Specifically, the DJSO 120 comprises a computer software program for constructing, compressing, and decompressing audio files; a database for storing compressed audio files; and the software necessary to stream audio files. The motivation for DJSO is that in conventional radio broadcasts, the DJ normally "talks over" the beginning of songs by introducing the song or the artist. Alternatively, the DJ will talk over the end of a song in order to transition to new content. In an embodiment of the PRS, the DJAE's may be pre-recorded with the combination of the introduction and beginning of a song. The newly created DJAE may be stored as a new type of AE (e.g., a DJ introduced song ("DJS")). However, the total number of DJS AE's is the product of the number of DJ's and the number of Songs. Thus, the storage of the combined audio elements is only feasible when there are relatively few DJ's (or few songs). For example, if the PRS supports approximately 100 DJ's and 10,000 songs, the combination of DJ's and songs would require the storage of 1,000,000 DJS AE's that are recorded and stored separately from the Songs AE's. Once again, these AE files may be stored in a compressed format (e.g., MP3 or RealAudio). Even so, a significant amount of storage is required to store each song with an overlapping of the DJ introduction (or "outroduction"). Accordingly, a need exists for a method of combining a DJ introduction with a song audio element file without having to record a large number of DJS AE's.

In an embodiment, the DJSO 120 in FIG. 12 eliminates the need to record a large number of DJS AE's. One potential solution to this problem would be to simply mix the audio of a song AE with the audio of a DJ introduction AE at the time of the broadcast. This avoids the massive duplication of songs described above. However, given the compressed file representations of these audio elements, it is very difficult to mix (combine) the audio from the DJAE with the song AE (so that the two can be heard at the same time). Therefore, in an embodiment of the PRS of the present invention, the system may first uncompress the files, mix them as uncompressed files, and then re-compress. Although this solution eliminates the need for a large amount of storage, the re-compression step requires a great deal of computation. Typically, compression is far more expensive than decompression. Compressing a 3-minute song takes approximately 3 processor minutes on an Intel Pentium III 700 MHz processor. As a result, compressing a single audio stream requires 100% of the processing power of a single processor. Thus, given that the PRS system may handle up to 100,000 users in an embodiment of the invention, it is infeasible to dedicate 100,000 processors dedicated to this re-compression function.

Figure 13:
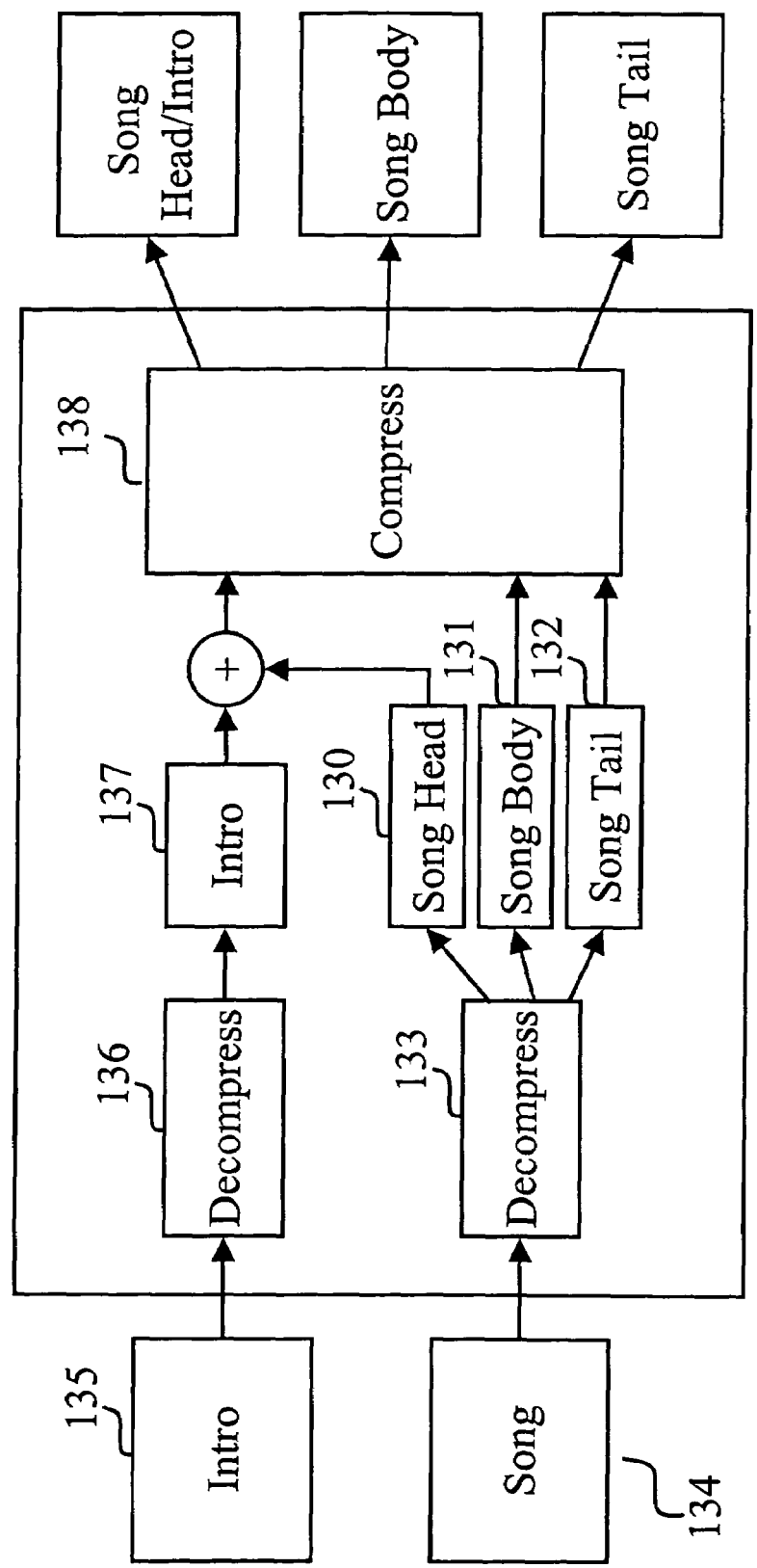
FIG. 13 shows a more detailed block diagram of the Disc Jockey Song Overlap Scheme according to an embodiment of the present invention.

The present invention overcomes some of these problems by providing a DJSO 120 as shown in FIGS. 12 and 13. The DJSO pre-computes the audio created by mixing the DJAE and the Song AE; the result may then be compressed and stored for rapid retrieval and immediate use later. In operation, the DJSO first divides and decompresses (at block 133) each compressed song audio file 122 into three components: a HEAD 130, a TAIL 131, and a BODY 132. The HEAD is the beginning portion of the song 134. The BODY is the middle portion, and the TAIL is the end of the song. Similarly, the song Intro 135 is decompressed at block 136 to form a song introduction. Each of these portions is compressed separately at compressor 138 so that when the HEAD, TAIL, and BODY are concatenated and streamed together, the user's audio player plays the entire song in an unaltered manner. Note that the concatenation operation is very simple, in that the AES need only play the HEAD AE, followed directly by the BODY AE, and then the TAIL AE. This operation is computationally trivial, requiring almost no processing time. As a result the concatenation of these files can be done for 1000's of simultaneous users on a single computer.

Additionally, the song components are defined so that the BODY portion of the song is never overlapped ("talked over") by any Jock. In other words, the HEAD portion is longer than the longest DJ introduction AE 124 for any particular song. Similarly, the TAIL is longer than the longest JOCK outroduction 126. In an embodiment, the length of the HEAD and TAIL for all songs can be set to be the same constant amount of time (perhaps 5 seconds). Accordingly, this limits the length of the longest overlap between DJAE and a song introduction AE, but it simplifies processing. Further, because the BODY is never overlapped by any DJAE it can be stored separately as a compressed Song BODY AE 128 independent of any introduction or outroduction. In addition to the BODY AE, for each song, one new AE is generated for each DJ introduction. This introduction AE is created by mixing the uncompressed versions of the HEAD and the DJ introduction to form a Song/Intro AE. Then, the result is compressed and concatenated with the BODY and TAIL to yield an audio stream in which the beginning of the song is mixed with the introduction while the end is unaltered. In addition, for each song, one new AE is generated for each DJ outroduction. This outroduction AE is created by mixing the uncompressed versions of the TAIL and the DJ outroduction. The result is then compressed so that it can be concatenated with the HEAD and BODY to yield an audio stream in which the end of the song is mixed with the outroduction to form a compressed Song Tail/Outroduction AE 129. In addition, the compressed song tail AE 125 may be stored for users who do not want any DJ audio elements.

Similar to the previously described system, the DJSO function 120 requires the duplication of AE's. An important advantage is that the BODY portion of each song need not be duplicated. The BODY portion is often more than 90% of the song, and as a result, 90% of the duplication is eliminated. Accordingly, the DJSO requires significantly less disk space to maintain the AE's.

Although this aspect of the invention is illustrated using DJ audio elements and Song audio elements, it should be understood that this aspect of the invention may be used to create other types of overlapping audio elements using any of the available audio elements. For example, the audio element overlap scheme of the present invention may be used to overlap a user specific reminder over a song audio element. Alternatively, a time audio element may overlap any other audio elements to allow the time to be announced at particular intervals during a broadcast (e.g., every hour).

Figure 14:
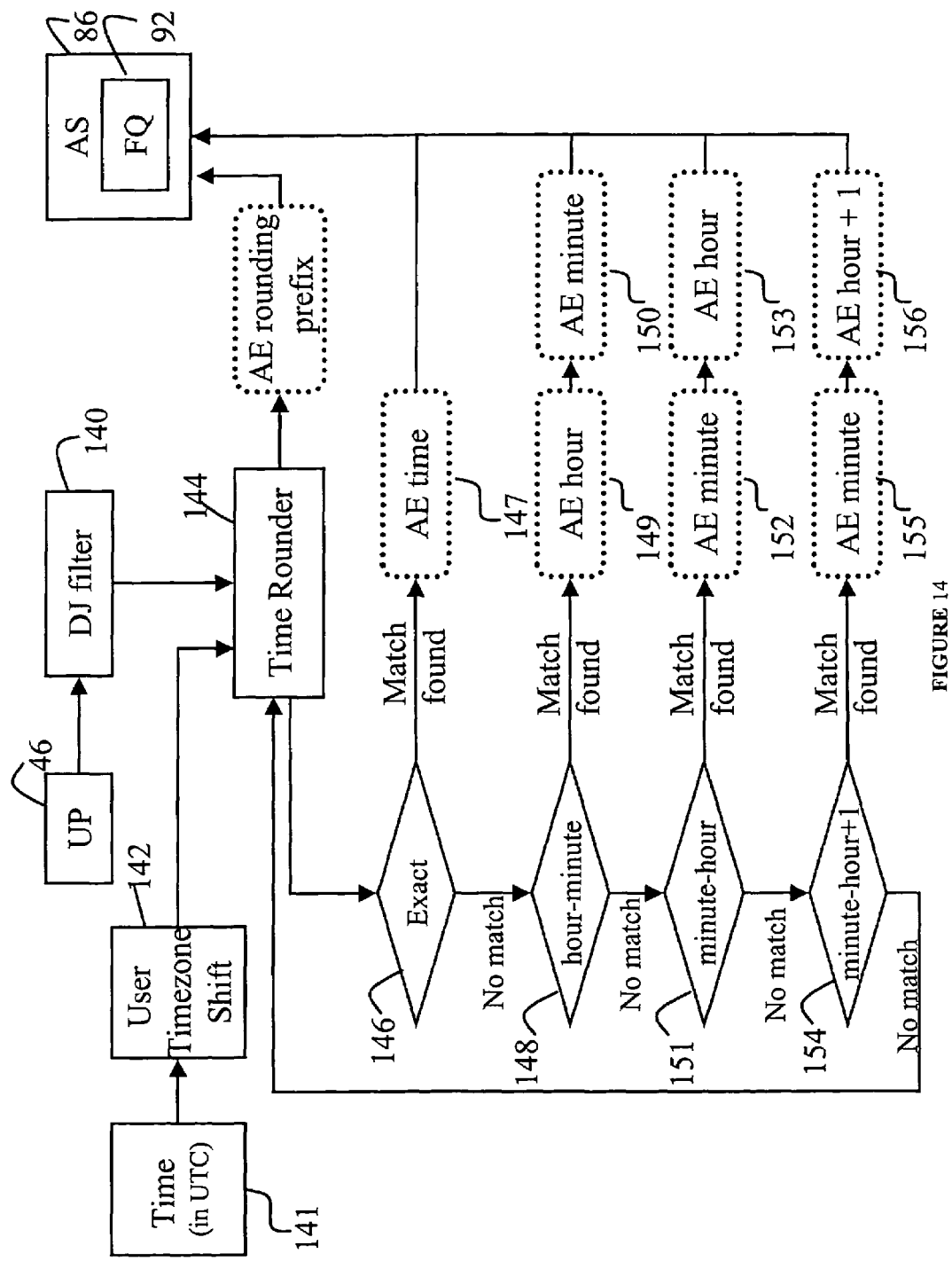
FIG. 14 is a flow diagram of the Audio Element Selector Function (AESF), which is responsible for assembling the best audio representation of the current time from the available data.

FIG. 14 illustrates another aspect of the present invention in which the number of Audio Elements required to be stored may be reduced. Specifically, the present invention contemplates the automatic assembly of numbers to form stock prices, dates or times when exactly matching audio does not exist; thereby reducing the number of audio elements needed to be stored in order to state stock prices, or alternatively, announce time. For example, there are approximately 1440 possible current time announcement audio elements that could be required if every time had to be recorded separately, (i.e., "12:00", "12:01", "12:02," etc. One simple solution which exists in the prior art today is to record hours and minutes separately, and then composite them to produce a time i.e., "12"+"00", "12'"+"'01'", "'12'"+"'02'" etc.) This may be done with 84 recordings (assuming the hours 1–24 are different audio than the minutes 1–24). While minimally functional, such a system does not produce high quality audio, and does not produce times in the way that people are used to hearing them. The current invention contains a system for assembling time and number audio in a more natural way, while allowing for the incorporation of exact-match audio when it is available. While presented in the context of the PRS, this invention has many uses beyond PRS. Specifically, this aspect of the present invention may be used in any audio system, including phone banking and phone information systems, automated teller machines, or any similar audio system that requires the generation of audio elements that represent numbers.

Turning to FIG. 14, a program flow diagram is shown illustrating the time audio generation feature of the present invention. This feature results in a reduced number of audio elements that must be stored in the AEDB 44. The system acts to retrieve the exact time when the corresponding audio element is available, but otherwise combines a series of time AE's in order to construct an approximate time announcement.

First, at step 140 the AE's from DB 36 pass through a DJ Filter, which eliminates all AE's that are not recorded by an appropriate DJ as indicated in the UPDB 46. The current system time 141 is then converted in step 142 into the user's local time zone based on information contained in the UPDEM 56 of the UPDB 46.

Next, the type of match is selected in order of priority. For a time audio the types of matches are EXACT HOUR-MINUTE, MINUTE-HOUR, MINUTE-HOUR+1. In the next step at 144, the time is rounded to the highest precision used by the system. The Accuracy Prefix is then set to NOW in step 155. An embodiment of the invention has minutes as its highest precision, but other levels of precision could be used (e.g., more precise (seconds) or less precise (every 5 minutes)).

The match type is then used to select a filter that eliminates all AE's that do not match the time with the method indicated. At step 146, the AEDB is checked for EXACT matches. In order to have an EXACT match, the AE must contain audio that completely describes the time (i.e., "'quarter after three'". Similarly, at step 148, the system checks for HOUR-MINUTE filter match AE's that describe the hour proceeding a minute and a minute following an hour (i.e. "'three'" "'fifteen'"). If no match is found, the system in step 151 checks for MINUTE-HOUR filter match AE's that describe the minute proceeding an hour and an hour following a minute (i.e., "quarter after" "three o'clock"). Finally, in step 154, the MINUTE-HOUR+1 filter matches AE's that describe the minute proceeding the upcoming hour and the upcoming hour following a minute (i.e., 'quarter to' 'four o'clock').

If there are AE's (or AE's pairs in the case of audio composition) that pass through the filter, then the ASTF is finished, and the Accuracy Prefix and one of the selected time AE's (or pair of AE's) are passed to the ASTFQ 92. If no AE's pass though the filter, then the time is rounded to the next level of precision at step 144. In an embodiment, the increments in steps of rounding are 5, 10, 15, 20 and 30 minutes. In an exemplary embodiment, the rounding precision preferences need not be sorted in order of precision. For example, rounding may be done to the nearest 15 minutes before rounding to the nearest 10 minutes. After rounding, the actual user time is compared to the rounded user time. If the actual user time is less than the rounded time, the Accuracy Prefix is set to BEFORE; if it is greater, then the Accuracy Prefix is set to AFTER. Computation then resumes at step 146.

Steps 144–156 are repeated until such time as appropriate audio elements are selected. In the unlikely event that still no match is found, then the Time AESF fails. This will only happen though in the data-poor case in which there are virtually no time AE's in the AEDB.

In alternate embodiments, the present method may be used for numbers such as stock prices. With stock prices, precision may be considered more important than audio quality. In an exemplary embodiment involving stock prices, match types of EXACT, DOLLAR-FRACTION, HUNDREDS-TENS-ONES-FRACTION may be used along with the accuracy prefixes of EXACTLY, UNDER, and OVER.

Figure 15:
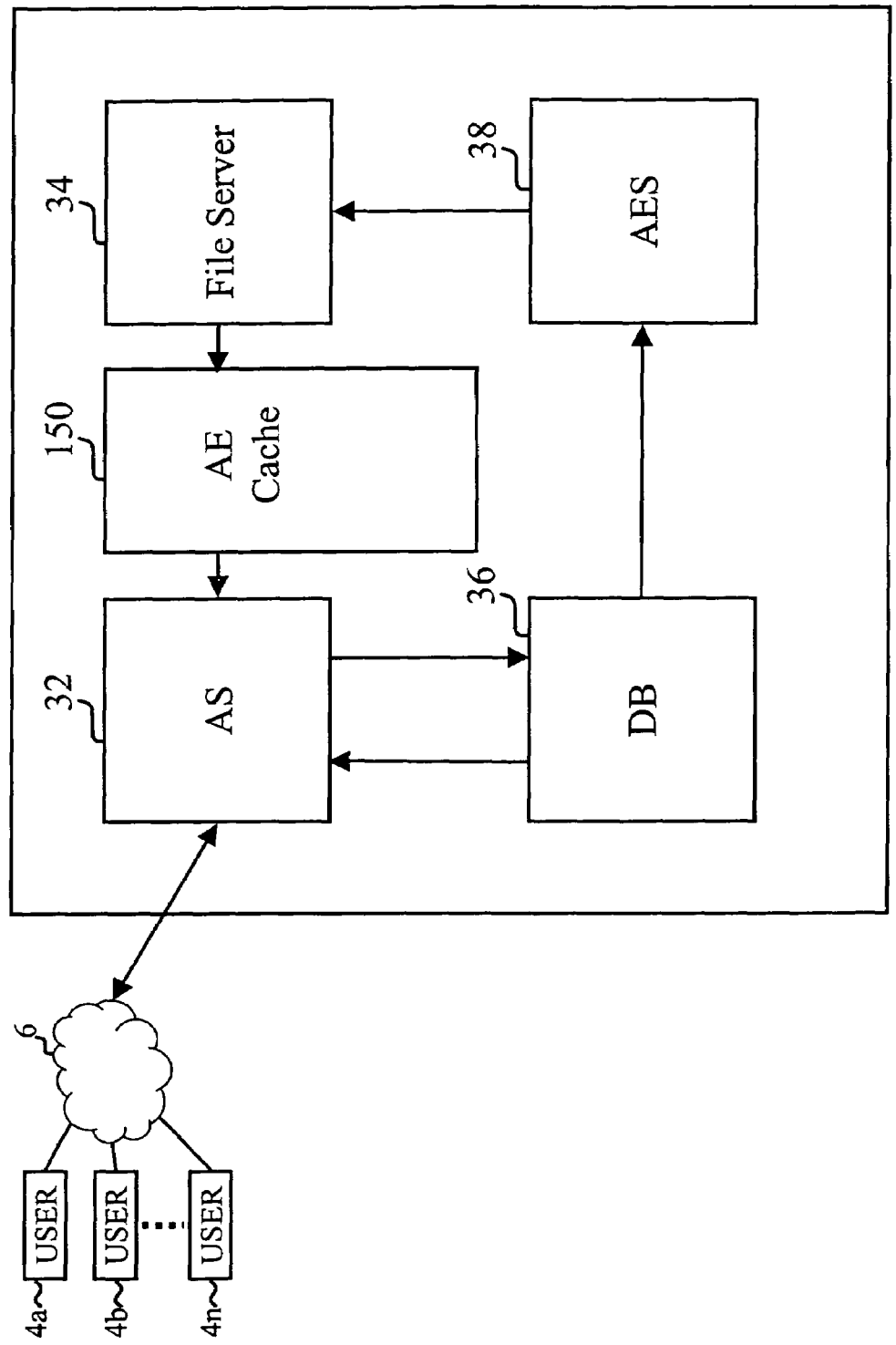
FIG. 15 illustrates a high-level block diagram of the User Customized Audio Element Cache (UAEC) of the present invention.

FIG. 15 illustrates an alternate embodiment of the present invention that includes a User Customized Audio Element Cache (UAEC) 150. The UAEC includes a memory data structure and the software necessary to retrieve and store cached audio elements for a particular user. After each user logs in, the UAEC stores a large percentage of the audio elements that the user may want to listen to over the course of a predetermined period of time (e.g., one hour). The cached AE's may include songs, introductions, outroductions, advertisements, news reports, DJAE's (such as jokes/stories), and other appropriate AE's. These AE's are determined by the particular user's AESF that is running in the AES 38. The AESF for the particular user selects the AE's to cache based on the user profile database 46 and user history database 48.

By caching the AE's, the UAEC may reduce the load on the DB by several orders of magnitude. In an exemplary system, based purely on bandwidth issues, the PRS may support 100,000 users with approximately 50 audio servers. In this embodiment, each user consumes 20 kilobits per second (kbps) of bandwidth. A simple Linux server handles well over 40 megabits per second (Mbps) (disk bandwidth is 400 Mbps and network bandwidth is up to 100 Mbps). Therefore, each Linux server can easily handle the bandwidth required for audio streams for approximately 2000 users. Given 2,000 users, there will be 2,000 different audio segments retrieved every 15 seconds (because the average AE is 15 seconds, and there are potentially 2,000 users per server). As a result, the PRS must play on average 6700 unique segments per second. No single database server could handle this many requests. Further, most distributed database systems could not handle this load. For example, given 1000 servers in the PRS, there would be approximately 100 users per machine, making approximately 6.7 transactions per second—approaching the limit of high performance database systems that are available today.

Using the UAEC, the number of transactions per second required to support the maximum number of users may be reduced by a factor of two hundred. This dramatic reduction is achieved by caching (or pre-fetching and storing) approximately one hour's worth of audio elements when the user logs into the system. Most of what the user will want to hear is static audio content (songs, introductions, ads, etc.). Because the user's preferences and history are known at login and will not change significantly in the course of an hour (at least not in a typical hour), the UAEC can accurately predict the AE's that may be required in the future.

In operation, the caching process utilizes the AESF to select not just the next AE to be played, but the next N AE's that will be played of each type (where N is a large number determined by the system designer). In an exemplary embodiment, one hour of AE's is cached, resulting in approximately 240 AE's (each approximately 15 seconds) being cached for each user. Similar to the operation without a UAEC, each user's AESF executes queries against DB 36. Each query returns AE's suited to the current user's profile and usage history.

In an alternate embodiment, rather than return a single set of AE's, many different sets of AE's are returned. For example, AE's corresponding to the best 100 songs that relate to the user's profile, the 100 most appropriate advertisements, and the 20 most appropriate sporting team reports, etc. By providing the additional content to the UAEC, the AES may randomize the selection of content. Further, the additional content permits the AESF to skip past AE's if the user supplies negative feedback, then obtain additional content without having to access the FS 34 or DB 44. Instead, the cache is accessed to retrieve AE's. Accordingly, a PRS using a UAEC 150 generates 2000 transactions per hour (one per user login) to the FS 34 and DB 36, rather than 2000 transactions every 15 seconds. The cached system generates 0.5 transactions per second (as opposed to the 133 transactions per second that would occur without a cache). This transaction load is quite feasible with currently available database systems.

Although caching has several benefits, it should be noted that the use of the UAEC 150 is not always appropriate to cache AE's for an entire hour. For example, AE's for stock quotes, weather, and traffic may be updated more frequently than every hour. Accordingly, these types of time critical information are retrieved as needed from the DB servers. Even so, because the expected number of stock, weather, or traffic reports per user per hour is relatively low, directly accessing the DB 36 and FS 34 for these types of audio elements only requires, on average, an additional 0.5 transactions per second.

In addition, it is also possible to handle traffic, weather, and stock reports as special cases in order to permit AE's to be dynamically updated on the FS 34 without any changes made to either the DB 44 or AES 38. Specifically, the AE identification for the "current traffic" never changes. The AE file corresponding to the AE identification number, however, is updated as the conditions change. As a result, the traffic report that is played to the user is updated as needed with no additional transactions against the DB and no changes to the AES.

Another aspect of the present invention involves a highly efficient comparison method within each AESF 42 for selecting audio elements based on a user's profile. An exemplary audio element that is selected based on the user's profile is an advertising AE. In operation, the AES selects an advertisement AE for a particular user based on the set of demographic properties stored in the UPDEM component 56 of each user profile. Typical demographic information may include, for example, an indication that the user has the following demographic information: MALE, UNDER-20, LIKES-COMPUTERS, INTERESTED-IN-PURCHASING-COMPUTER, CAR-OWNER, HOMEOWNER, etc. It should be understood that this list of demographics is merely intended to be exemplary. Any number of demographic information may be stored in the UPDEM 56 without departing from the scope of the present invention. The AESF then matches an appropriate advertisement based on the user's demographic information. The purpose of matching an advertisement to a particular user is that the advertiser wishes to pay only for advertisements shown to a particular sub-group of the PRS audience. Alternatively, the advertiser may wish to pay more for advertisements played to a particular sub-group of the PRS audience. For example, an advertiser may wish to match the sex of a particular user to a particular advertisement (e.g., a golf shop wants to advertise specifically to men).

Figure 16A:
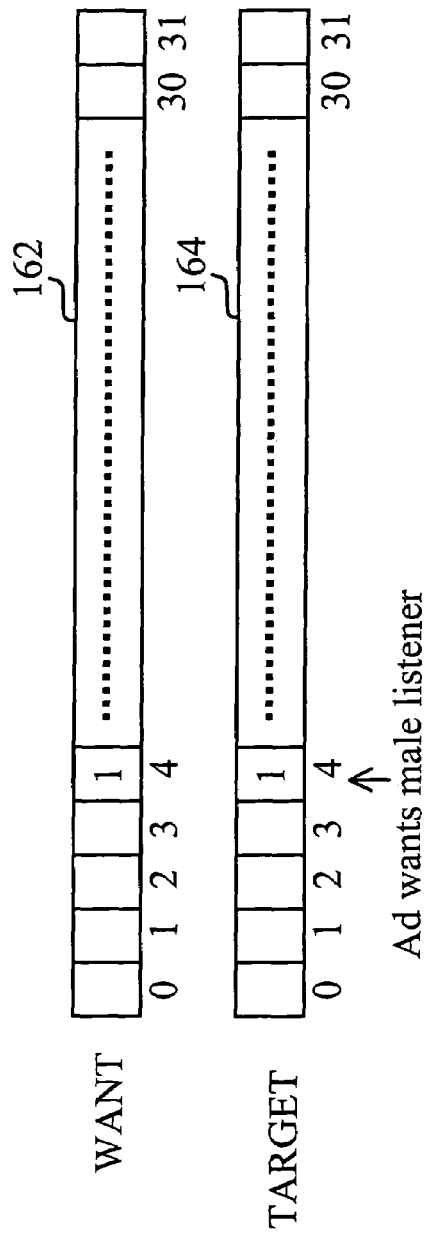
FIGS. 16a–c show the data structures used in the determination of the content to provide a user.

In an embodiment, the present invention solves the inefficiencies associated with using traditional selection methods for choosing an appropriate AE. Specifically, the present invention contemplates the use of a User Property Comparison Mechanism (UPCM), which comprises a set of data structures in the UPDB 46 and the AEDB 44, and a software routine in the AES 38 for efficiently comparing these properties. As illustrated in FIG. 16*a*, the illustrated data structures represent the target demographics for a particular audio element; and as illustrated in FIG. 16*b*, the data structures represent the user demographics.

Figure 16B:
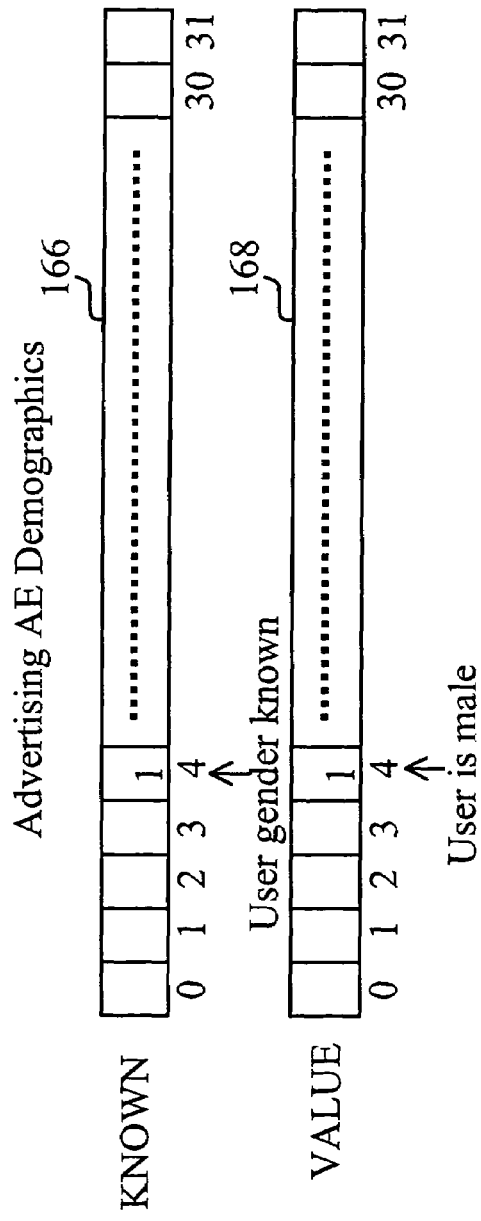
Figure 16C:
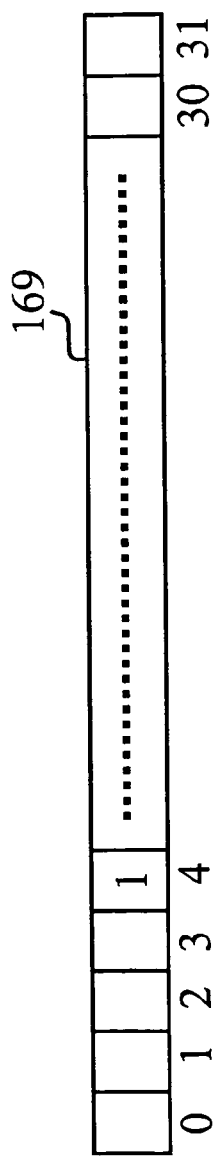

As shown in FIGS. 16*a*–*c*, the UPCM utilizes a trinary property (TRIT) representation to store and efficiently compare these demographic properties. For most demographic properties, the information is inherently trinary (i.e., three-valued, rather than two-valued). For example, a particular user may be female and therefore the value of the demographic property MALE would be "false." However, if that user were male, then the demographic property MALE would have the value "true." Finally, it is possible that for other users in the PRS system that the value of MALE is unknown (i.e., because they have not chosen to answer that question and that information is unavailable from other sources). Accordingly, the valued store for the MALE demographic property for a user may potentially take on three values (MALE, NOT-MALE (female), and UNKNOWN), and is therefore trinary.

Similarly, the demographic properties in an UPDEM 56 of the present invention are inherently trinary. For example, an advertiser may wish to provide advertisements only to males. Accordingly, the demographic property MALE would be set to "true" for a particular advertisement. Another advertiser may not care if the user is MALE. Accordingly, the property would have to be represented as something other than true or false. Thus, based on the foregoing, the advertising AE properties are also trinary.

The trinary representation is important because for the each current user, the AES tests all ads to determine if the user is in that advertisement's demographic target audience. Each of these advertisements is a candidate for inclusion in the PRS user customized broadcast. However, given that there are potentially several hundred properties, storing each property as a separate column in a database table can be very inefficient, perhaps requiring an entire word of memory per demographic property per user. One conventional alternative is to pack several properties into a single word of memory and to then store the word as a single column. Then, in order to match the properties, the matching program must first extract an entire word from the column and compare it. These operations are not efficient and are sometimes unavailable within commercial database packages.

Accordingly, the TRIT representation is efficient both in storage and retrieval. As illustrated in FIG. 16*a*, an exemplary TRIT representation for each property is stored as 1 bit in two separate words. Given that a typical computer word is either 32 or 64 bits, either 32 or 64 properties can be stored in a pair of words. The 32 (or 64) properties stored in these two words can be compared in parallel by direct operations on the words. The properties need never be extracted. In the case of an advertisement, the two computer words may be known as WANT 162 and TARGET 164. For each user, the two words may be known as KNOWN 166 and VALUE 168. The nth bit of the WANT and TARGET words is associated with the nth demographic property (for example, the 4th bit may be associated with the property MALE). The nth bit of the KNOWN and VALUE words are also associated with the nth demographic property.

In an exemplary embodiment, the representation used in these words is as follows: if the target demographic for an advertisement is for male users, both the WANT bit (indicating that the advertisement should be targeted only to listeners who fit into this demographic) and the TARGET bit (indicating that the advertiser wants to target the advertisement to users who are male) for the MALE property is set (have the value "1"). Alternatively, if the target is female users, then WANT=1 and TARGET=0. Finally, if the target is both men and women, then the particular demographic is not at issue, and WANT=0 and TARGET is unused and can be either value.

User demographic information is represented similarly. If a user is male, the KNOWN bit (indicating that the particular demographic "is" "known") is set to 1, and the VALUE bit (representing whether the particular user falls includes the particular demographic) is also set to 1. Similarly, if the user is female, then KNOWN=1 and VALUE=0. If the sex of the user is unknown, then KNOWN=0 and VALUE can be either 1 or 0. Referring only to a single property, a user is in the target audience of the advertisement if the following Boolean logic statement is true:

(not WANT) or (KNOWN and (TARGET xnor VALUE))

Accordingly, because this determination can be made using Boolean logic, an important aspect of the present invention is that the TRIT representation allows the properties in the WANT, TARGET, KNOWN, and VALUE words to be compared at the same time using bit-wise binary operations that are both common and very efficient in computer processors (taking one cycle or less). The bit-wise binary operations result in a word 169 containing the results of comparing the 32 (or 64) properties. Thus, if each of the bits in the resulting word is 1, then the user is in the target audience of the advertisement.

In addition, most modern-day CISC (complex instruction set computer) systems have a native 'xnor' (not exclusive-or) operation, on systems that do not, the xnor functionality can be replicated by combining other primitive Boolean operations:

If 'xor' (exclusive-or) is available:

(not WANT) or (KNOWN and (not (TARGET xor VALUE)))

otherwise:

(not WANT) or (KNOWN and ((TARGET and VALUE) or ((not TARGET) and (not VALUE)))

can be used. In all three embodiments, the computation is extremely efficient because the operations "not,", "and,", "'or,'" "xor," and "'xnor'" are both numerically simple, and also fundamental to the operation of modern computing, and have therefore been highly optimized. In most situations each operation will take only a single CPU cycle.

In an alternate embodiment, if the total number of properties is greater than the number of bits in a word of memory, then multiple TRIT words may be used. The user is in the target audience for the advertisement if all of the TRIT word comparisons match.

In yet another embodiment of the present invention, the TRIT concept can be easily extended to properties that can take on more than 2 values. For example, one such property might be the CITY demographic (indicating the city where the user lives), for which there may be hundreds of potential values. This demographic could be stored as a single 9-bit property (which would allow for a total of 512 possible cities). Then, as illustrated in FIGS. 17*a*–*c*, the TRIT representation may be extended so that 9 bits of the WANT word 170, the TARGET word 172, the KNOWN word 174, and the VALUE word 176 are associated with the CITY demographic property. If the advertiser wishes to target a particular city, then all 9 of the WANT bits are set 1. The TARGET is set to the city code (in the illustrated embodiment, the city code for Austin is set as "100100110"). If the user enters the user's city of residence into the PRS system, then all 9 of the KNOWN bits are set to 1 and the VALUE bits are set to the code corresponding to that city. And once again, performing the same Boolean algebra, when all the bits in the result 178 are "1's," then the user has indicated that they live in the city to which the advertisement is targeted.

Figure 18:
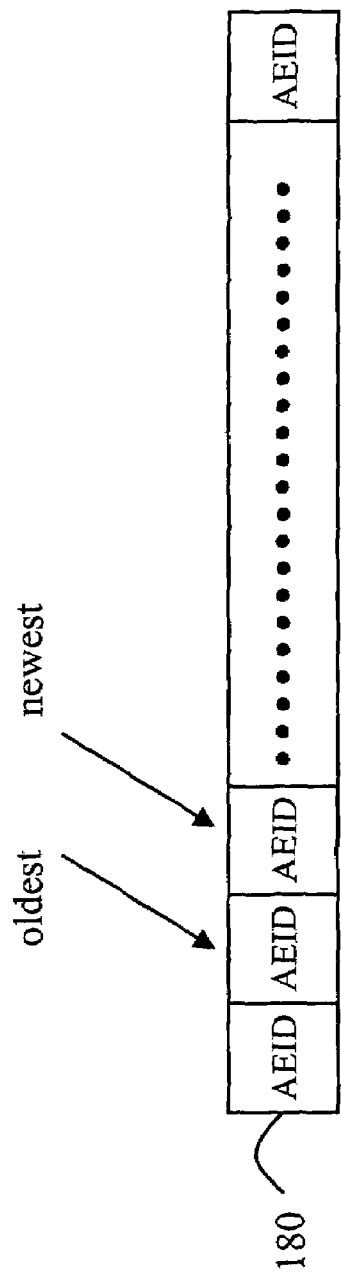
FIG. 18 is a diagram of an exemplary exclusion list data structure according to an embodiment of the present invention.

In yet another aspect of the present invention, the PRS may include an exclusion list (XLIST) scheme for insuring a variety of content to a user. According to this aspect of the invention, the XLIST is used by the AES to insure that two identical, similar, or closely related AE's are not played in close sequence. The XLIST scheme comprises a data structure 180 (as illustrated in FIG. 18) in the DB 36 that includes information about the most recently played AE's, and a software component of the AES that updates and maintains the XLIST data structure 180. Once created, the XLIST is used by the AES in the selection of the next AE of a similar type content (e.g., song, news, etc.).

In an embodiment, one exclusion list (XLIST) is created for each type of AE played by the PRS. In an exemplary embodiment, the XLIST is represented as a ring buffer in which the AEIDs are maintained for the N most recently played AE's (where N is selected by the system designer). As is well known in the computer science field, a ring buffer is a fixed length buffer in which the newest element to be added to the buffer is added by writing over the oldest element. After an audio element is played by the PRS, the AES stores the AEID in the XLIST data structure corresponding to that type of AE. Thus, the XLIST may be used by the AES to insure that two identical, similar, or closely related AE's are not played in close sequence.

One example of the utility of the XLIST is in the selection of songs. In operation, the AES selects and caches a number of songs based on the information contained in the UPMP (music preference) portion of the user profile. In an embodiment, the 100 top songs that meet the user's criteria are retrieved and stored. If the user's preferences have not changed since the last log in, the same 100 songs may be retrieved and cached on the next login. And if the AES selects the songs in order of ranking, the same songs may be played every time the user logs in. Even if the selection of an AE is random, there is a real risk that the same songs may be chosen each time a user logs into the system. In the case of a song, the information stored includes the song id 182 and the song artist 184. Using this information the AES can reject songs that are either identical to a recently played song or have the same artist.

The XLIST may also be created for other types of AE's like news reports or traffic reports. In the case of a traffic report, the AE's associated with the set of roads driven by the user are returned to the AES. When constructing a traffic report, it is important that a particular AE that refers to a particular road, should not be played twice.

In some cases, the user may wish to hear multiple songs by the same artist. In conventional radio, this practice is called playing a "two-fer." Accordingly, the XLIST may also be used to insure that pairs of songs from the same artist are played.

Figure 19:
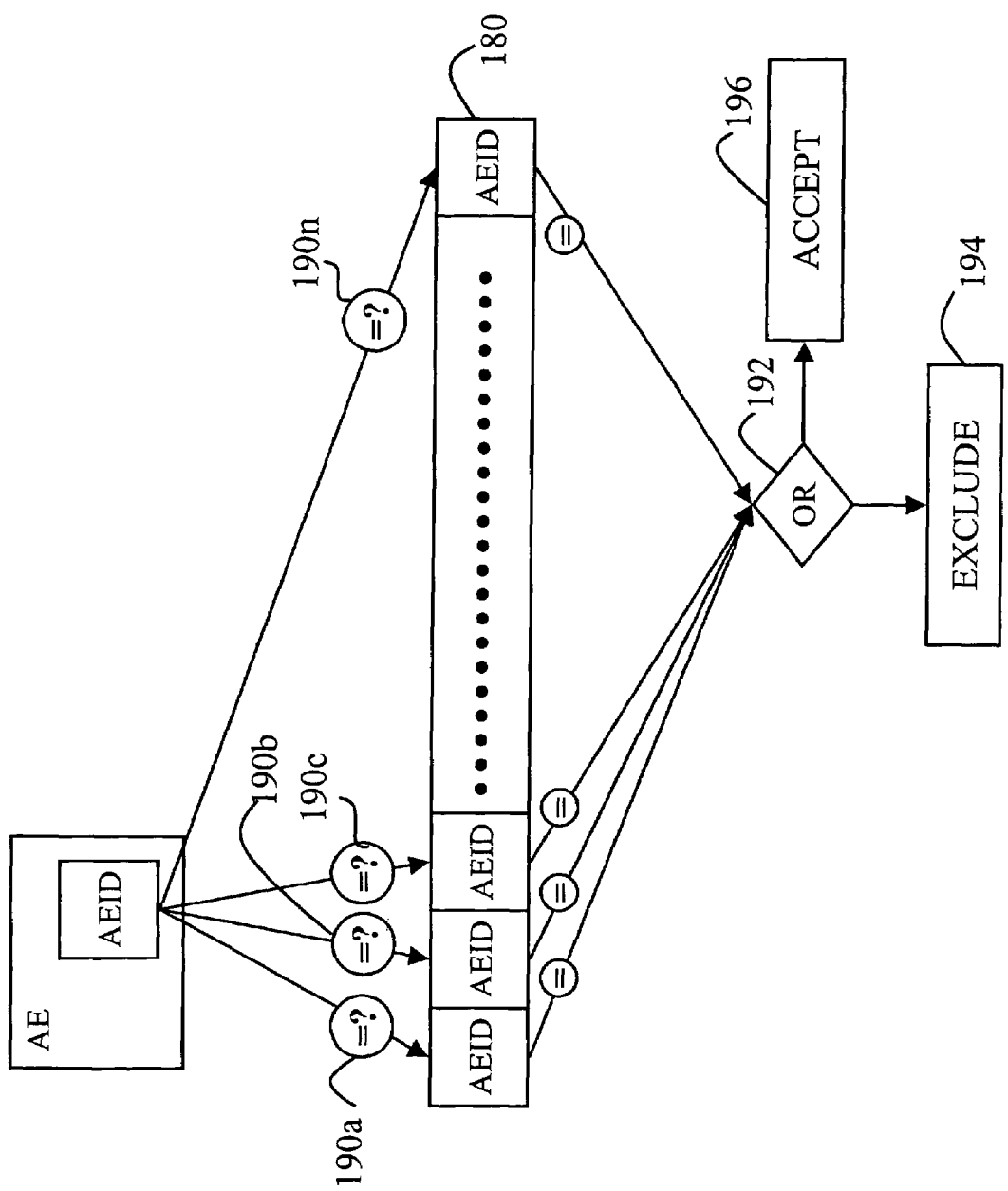
FIG. 19 is a graphical representation of the use of an exclusion list data structure according to an embodiment of the present invention.

FIG. 19 provides a block diagram of an exemplary flow diagram of a system for using the XLIST of the present invention. Once an audio element is selected, the AEID is compared to the AEID's in the XLIST corresponding to the type of AE selected (190*a–n*). If any of the comparisons results in a determination that the selected audio element is in the XLIST (represented by the "OR" decision box at 192), then the audio element is excluded at 194. If the comparison does not establish that the selected audio element is in the XLIST, then the audio element is accepted at step 196.

While the invention may be adaptable to various modifications and alternative forms, specific embodiments have been shown by way of example and described herein. However, it should be understood that the invention is not intended to be limited to the particular disclosed embodiments. Rather, the invention is to cover all modifications, equivalents, and alternatives falling within the spirit and scope of the invention as defined by the claims. Moreover, the different aspects of the disclosed system and methods may be utilized in various combinations and/or independently. For example, the present invention is illustrated as providing a customized radio broadcast to one or more users. However, it should be understood that the concepts and inventions disclosed herein may be used in the transmission of other types of customized data. Specifically, the concepts and inventions disclosed herein may be used to provide customized video content to one or more users based on user profiles.

What is claimed is:

1. A method for customizing radio broadcasting for individual end users, comprising:
   creating a first data structure (referred herein as a VALUE data structure) representative of a first set of properties related to a user;
   creating a second data structure (referred herein as a KNOWN data structure) representative of whether said first set of properties is known;
   creating a third data structure (referred herein as a TARGET data structure) representative of a target set of properties related to an audio element;
   creating a fourth data structure (referred herein as a WANT data structure) representative of whether said target set of properties is wanted; and
   comparing said first, second, third, and fourth data structures using bit-wise binary operations to determine whether said first set of known properties are wanted as a target set of properties;
   storing the audio element into a cache memory upon determining that the first set of known properties are wanted as the target set of properties;
   selecting an audio element from the cache memory;
   comparing an identifier of the selected audio element to an identifier of a most recently played audio element; and
   rejecting the selected audio element if it is substantially similar to the most recently played audio element.

2. The method of claim 1 wherein said bit-wise binary operation are performed according to the Boolean equation: (not WANT) or (KNOWN and ((TARGET xor VALUE))).

3. The method of claim 1 wherein said bit-wise binary operation are performed according to the Boolean equation: (not WANT) or (KNOWN and ((TARGET and VALUE) or ((not TARGET) and (not (VALUE)))).

4. The method of claim 1 wherein said first, second, third, and fourth data structures are 16-bit computer words.

5. The method of claim 1 wherein said first, second, third, and fourth data structures are 32-bit computer words.

6. The method of claim 1 wherein said first, second, third, and fourth data structures comprise multiple computer words.

7. The method of claim 1 wherein at least one of said first set of properties and at least one of said target set of properties are represented as a single bit.

8. The method of claim 1 wherein at least one of said first set of properties and at least one of said target set of properties are represented as multiple bits.

9. A method in a computer system for selecting an audio element to transmit to a remote listener, comprising:
   creating a first data structure (referred herein as a VALUE data structure) representative of a first set of demographic properties related to a remote listener;
   creating a second data structure (referred herein as a KNOWN data structure) representative of whether said first set of demographic properties related to the remote listener is known;
   creating a third data structure (referred herein as a TARGET data structure) representative of a target set of demographic properties relating to an audio element;

creating a fourth data structure (referred herein as a WANT data structure) representative of whether said target set of demographic properties is wanted to be targeted; and comparing said first, second, third, and fourth data structures using bit-wise binary operations to determine whether the audio element should be transmitted to the remote listener;

storing the audio element into a cache memory upon determining that the first set of known properties are wanted as the target set of properties;

selecting an audio element from the cache memory;

comparing an identifier of the selected audio element to an identifier of a most recently played audio element; and rejecting the selected audio element if it is substantially similar to the most recently played audio element.

10. The method of claim 9 wherein said bit-wise binary operation are performed according to the Boolean equation: (not WANT) or (KNOWN and ((TARGET xor VALUE))).

11. The method of claim 9 wherein said bit-wise binary operation are performed according to the Boolean equation: (not WANT) or (KNOWN and ((TARGET and VALUE) or ((not TARGET) and (not (VALUE))).

12. The method of claim 9 wherein said first, second, third, and fourth data structures are computer words.

13. The method of claim 9 wherein said first, second, third, and fourth data structures are 32-bit computer words.

14. The method of claim 9 wherein said first, second, third, and fourth data structures comprise multiple computer words.

15. The method of claim 9 wherein at least one of said first set of properties and at least one of said target set of properties are represented as a single bit.

16. The method of claim 9 wherein at least one of said first set of properties and at least one of said target set of properties are represented as multiple bits.

17. The method of claim 9 wherein said first set of demographic properties includes the age of the remote listener.

18. The method of claim 9 wherein said first set of demographic properties includes the gender of the remote listener.

19. The method of claim 9 wherein said first set of demographic properties includes the marital status of the remote listener.

20. The method of claim 9 wherein said first set of demographic properties includes the city where the remote listener lives.

21. The method of claim 9 wherein said audio element is an advertisement.

22. A customized personal radio broadcast system operable to select an audio element to transmit to a remote listener, comprising:

means for creating a first data structure (referred herein as a VALUE data structure) representative of a first set of demographic properties related to a remote listener;

means for creating a second data structure (referred herein as a KNOWN data structure) representative of whether said first set of demographic properties related to the remote listener is known;

means for creating a third data structure (referred herein as a TARGET data structure) representative of a target set of demographic properties relating to an audio element;

means for creating a fourth data structure (referred herein as a WANT data structure) representative of whether said target set of demographic properties is wanted to be targeted; and means for comparing said first, second, third, and fourth data structures using bit-wise binary operations to determine whether the audio element should be transmitted to the remote listener means for storing the audio element upon determining that the first set of known properties are wanted as the target set of properties;

means from selecting at least one stored audio element;

means for comparing an identifier of the selected audio element to an identifier of a most recently played audio element; and means for rejecting the selected audio element if it is substantially similar to the most recently played audio element.

* * * * *